(12) United States Patent
 Abe

(10) Patent No.: US 8,845,241 B2
(45) Date of Patent: Sep. 30, 2014

(54) RADIUS END MILL AND CUTTING INSERT

(75) Inventor: Taro Abe, Bando (JP)

(73) Assignee: Mitsubishi Materials Corporation, Tokyo (JP)

( * ) Notice: Subject to any disclaimer, the term of this patent is extended or adjusted under 35 U.S.C. 154(b) by 1035 days.

(21) Appl. No.: 12/736,224

(22) PCT Filed: Mar. 31, 2009

(86) PCT No.: PCT/JP2009/056658
§ 371 (c)(1),
(2), (4) Date: Sep. 21, 2010

(87) PCT Pub. No.: WO2009/123192
PCT Pub. Date: Oct. 8, 2009

(65) Prior Publication Data
US 2011/0008112 A1    Jan. 13, 2011

(30) Foreign Application Priority Data

Mar. 31, 2008  (JP) ................................. 2008-089678
Feb. 6, 2009   (JP) ................................. 2009-026530

(51) Int. Cl.
*B23C 5/02*    (2006.01)
*B23C 5/10*    (2006.01)
*B23C 5/20*    (2006.01)

(52) U.S. Cl.
CPC ............. *B23C 5/109* (2013.01); *B23C 2210/50* (2013.01); *B23C 2210/0442* (2013.01); *B23C 5/20* (2013.01); *B23C 2200/203* (2013.01)
USPC ............................................ 407/54; 407/113

(58) Field of Classification Search
USPC ......... 407/34, 48, 114, 113, 116, 115, 53, 54, 407/103
See application file for complete search history.

(56) References Cited

U.S. PATENT DOCUMENTS 2,966,081 A  *  12/1960  Kallio ......................... 408/230
(Continued)

FOREIGN PATENT DOCUMENTS

EP      1348508 A1    10/2003
(Continued)

OTHER PUBLICATIONS

Notice of Allowance mailed Apr. 9, 2013, issued for the Japanese Patent Application No. 2010-505936 and English translation thereof.
(Continued)

*Primary Examiner* — Will Fridie, Jr.
(74) *Attorney, Agent, or Firm* — Edwards Wildman Palmer LLP

(57) ABSTRACT

A radius end mill including an end mill body which is rotated around an axis thereof; a chip discharge flute being provided at an outer periphery of a tip portion of the end mill body; a gash being provided at a tip portion of the chip discharge flute; a rake face being formed on a wall face facing an end-mill rotational direction in the chip discharge flute or the gash; a cutting edge being formed on the rake face; the cutting edge including an end cutting edge, an outer peripheral cutting edge, and a convex circular-arc-shaped corner cutting edge; the end cutting edge being formed at a side ridge portion on the tip portion of the rake face; the outer peripheral cutting edge being formed at a side ridge portion on the outer peripheral side of the rake face; the convex circular-arc-shaped corner cutting edge being formed at a corner side ridge portion formed by the end cutting edge and the outer peripheral cutting edge; wherein the corner cutting edge has a positive cutting edge inclination angle; and the portion of the rake face on the side of the side ridge portion along at least a portion of the corner cutting edge is inclined toward the rear side in the end-mill rotational direction as it approaches the outer peripheral cutting edge from the end cutting edge, and is formed in the shape of a twist face whose inclination toward the rear side in the end-mill rotational direction gradually becomes larger as it approaches the center of the convex circular arc formed by the corner cutting edge from the corner cutting edge.

20 Claims, 18 Drawing Sheets

(56) References Cited

U.S. PATENT DOCUMENTS

| | | | |
|---|---|---|---|
| 3,244,035 A * | 4/1966 | Jehle et al. | 408/204 |
| 4,946,318 A * | 8/1990 | David et al. | 407/42 |
| 5,915,888 A * | 6/1999 | Minicozzi | 407/54 |
| 6,193,446 B1 * | 2/2001 | Astrom et al. | 407/114 |
| 7,125,210 B2 * | 10/2006 | Kolker et al. | 409/234 |
| 2003/0198525 A1 * | 10/2003 | Iwamoto et al. | 407/54 |
| 2006/0060053 A1 * | 3/2006 | Tanaka et al. | 83/663 |
| 2006/0093445 A1 * | 5/2006 | Tsuchitani et al. | 407/54 |

FOREIGN PATENT DOCUMENTS

| | | |
|---|---|---|
| EP | 1591183 A1 | 11/2005 |
| JP | 60-142012 | 9/1985 |
| JP | 05-309514 A | 11/1993 |
| JP | 08-118133 A | 5/1996 |
| JP | 2003-025135 A | 1/2003 |
| JP | 2004-050338 A | 2/2004 |
| JP | 2006-26839 | 2/2006 |
| JP | 2007-144625 A | 6/2007 |
| WO | WO-2004/058438 A1 | 7/2004 |

OTHER PUBLICATIONS

Supplementary European Search Report dated Mar. 23, 2012, issued for the corresponding European patent application No. 09727129.0.
International Search Report dated Jun. 23, 2009, issued in PCT/JP2009/056658.

* cited by examiner

RADIUS END MILL AND CUTTING INSERT

TECHNICAL FIELD

The present invention relates to a radius end mill provided with a cutting edge having an end cutting edge, an outer peripheral cutting edge, and a convex circular-arc-shaped corner cutting edge at an outer periphery of a tip portion of an end mill body, and a cutting insert to be detachably attached to such a radius end mill of an indexable type.

Priority is claimed on Japanese Patent Application No. 2008-089678, filed Mar. 31, 2008, and Japanese Patent Application No. 2009-26530, filed Feb. 6, 2009, the content of which is incorporated herein by reference.

BACKGROUND ART

For example, as a radius end mill used for cutting work materials, such as a die, a radius end mill of the following structure and a cutting insert to be detachably attached to such a radius end mill of an indexable type are disclosed in Patent Document 1. This radius end mill has a tool body, and an outer periphery of a tip portion of this tool body is formed with a chip discharge flute which is spirally twisted. A planar main gash face where the angle of inclination with respect to an axis of the tool body is smaller than the helix angle of the chip discharge flute is formed on the inner peripheral side of a tip portion of the wall face of this chip discharge flute which faces the rotational direction of the tool body. An end cutting edge is formed at the tip of this main gash face, and a planar auxiliary gash face where the angle of inclination with respect to the axis is made greater than that of the main gash face and made smaller than the helix angle is formed on the outer peripheral side of the main gash face so as to be lower with respect to the main gash face via a stepped portion which extends substantially perpendicularly to the end cutting edge. A corner cutting edge which has a substantially convex circular-arc shape from the tip of this auxiliary gash face to the outer periphery thereof is connected to the outer peripheral side of the end cutting edge. An outer peripheral cutting edge is formed at a side ridge portion on the outer peripheral side of the wall face of the chip discharge flute so as to be connected to a rear end of the corner cutting edge.

In such a radius end mill, the cutting edge strength which is enough to resist cutting load can be secured by increasing the wedge angle, high sharpness can be given to the corner cutting edge, cutting resistance can be reduced. In addition, chip processability can be improved even if chips tend to get long when chips flow out, by crashing chips generated in the portion of the corner cutting edge, particularly from a protruding end of a corner portion to the outer peripheral cutting edge thereof, into the stepped portion between the auxiliary gash face and the main gash face.

[Patent Document 1] PCT International Publication No. WO 2004/058438

DISCLOSURE OF INVENTION

Problems to be Solved by the Invention

Meanwhile, in the radius end mill described in the Patent Document 1, the auxiliary gash face is formed in a planar shape which is gradually lower toward the rear side in a tool rotational direction as it approaches the rear end side in the direction of the axis of the tool body. Therefore, the axial rake angle of the corner cutting edge formed at the side ridge portion is also set to a positive angle, the end cutting edge is arranged on a so-called core, and the radial rake angle of the end cutting edge is set to a negative angle. Thus, the radial rake angle of the corner cutting edge connected to this end cutting edge is also set to a negative angle on the side of the end cutting edge, and increases toward the positive angle as it approaches the outer peripheral cutting edge.

Accordingly, in such a radius end mill, the cutting edge inclination angle of the corner cutting edge or a normal rake angle in a cross-section perpendicular to the cutting edge changes gradually along the corner cutting edge. Particularly, the normal (right) rake angle changes at first increases to the negative angle from the end cutting edge toward the outer peripheral cutting edge, and then increases to the positive angle. Therefore, there is a possibility that cutting resistance increases locally and stable cutting becomes difficult, or cutting edge strength does not become constant, and fractures easily arise. Additionally, as the cutting edge inclination angle changes, chip discharge performance also differs locally.

The invention was made under such a background. Particularly, a first object of the invention is to provide a radius end mill and a cutting insert for an indexable radius end mill capable of suppressing a drastic change in a normal rake angle along a corner cutting edge, to achieve stable cutting and extending of the life of tools, and a second object of the invention is to provide a radius end mill and a cutting insert for an indexable radius end mill capable of suppressing a change in cutting edge inclination angle to secure smooth chip discharge performance.

Means for Solving the Problems

In order to solve the above problems and achieve the first object, a radius end mill of the invention is a radius end mill including an end mill body which is rotated around an axis thereof; a chip discharge flute being provided at an outer periphery of a tip portion of the end mill body; a gash being provided at a tip portion of the chip discharge flute; a rake face being formed on a wall face facing an end-mill rotational direction in the chip discharge flute or the gash; a cutting edge being formed on the rake face; the cutting edge including an end cutting edge, an outer peripheral cutting edge, and a convex circular-arc-shaped corner cutting edge; the end cutting edge being formed at a side ridge portion on the tip portion of the rake face; the outer peripheral cutting edge being formed at a side ridge portion on the outer peripheral side of the rake face; the convex circular-arc-shaped corner cutting edge being formed at a corner side ridge portion formed by the end cutting edge and the outer peripheral cutting edge;

wherein the corner cutting edge has a positive cutting edge inclination angle; and the portion of the rake face on the side of the side ridge portion along at least a portion of the corner cutting edge is inclined toward the rear side in the end-mill rotational direction as it approaches the outer peripheral cutting edge from the end cutting edge, and is formed in the shape of a twist face whose inclination toward the rear side in the end-mill rotational direction gradually becomes larger as it approaches the center of the convex circular arc formed by the corner cutting edge from the corner cutting edge.

Accordingly, in such a radius end mill, the corner cutting edge is designed to have a positive cutting edge inclination angle. Thus, the portion of the rake face on the side of the side ridge portion along the corner cutting edge is inclined toward the rear side in the end-mill rotational direction as it approaches the outer peripheral cutting edge from the end cutting edge. In this regard, the portion is formed in the shape of a twist face whose inclination gradually becomes larger as it approaches the center of the convex circular arc formed by the corner cutting edge from the corner cutting edge as described above. Thus, it is possible to suppress the normal (right) rake angle of the corner cutting edge, or the tendency of increase and decrease thereof changes greatly as it approaches the outer peripheral cutting edge along the corner cutting edge from the end cutting edge.

For this reason, according to the radius end mill of the above configuration, it is possible to prevent that cutting resistance increases in a specific portion of the corner cutting edge due to such a change, and vibrations are generated on the end mill body, or cutting edge strength becomes low locally at the corner cutting edge, and any damage, such as fracturing or chipping, occurs. Additionally, since the corner cutting edge is designed to a positive cutting edge inclination angle as described above, favorable chip discharge performance can be obtained, machining accuracy can be improved by promoting stable cutting, and the life of tools can be extended.

Particularly, the portion of the rake face on the side of the side ridge portion along at least a portion of the corner cutting edge is formed in the shape of such a twist face, so that the cutting edge can be set to have a constant normal rake angle in the portion which is formed in the shape of a twist face. Thereby, chips generated by the cutting edge in the portion can be more smoothly processed, and a local change in cutting resistance or edge strength can also be prevented more reliably.

Additionally, in order to achieve the above second object, according to the invention, in the radius end mill of the above configuration, preferably, the corner cutting edge is formed in a spiral shape which is twisted toward the rear side in the end-mill rotational direction along a partial doughnut-shaped convex curve which is formed by a rotational locus when a convex circular arc formed by the corner cutting edge as seen from a direction facing the rake face is rotated around the axis as it approaches the outer peripheral cutting edge from the end cutting edge.

According to such a radius end mill, the corner cutting edge is formed in a spiral shape along a partial doughnut-shaped convex curve as described above. Thereby, it is possible to suppress the cutting edge inclination angle from changing greatly, and thereby, the discharge performance of chips generated by the corner cutting edge can be prevented from changing locally. Accordingly, favorable chip discharge performance obtained by giving a positive cutting edge inclination angle to the corner cutting edge as described above can be maintained over the total length of the corner cutting edge, and smooth chip processing can be achieved to promote stable cutting.

Additionally, particularly about the cutting edge inclination angle, the cutting edge is set to have a constant cutting edge inclination angle not only in the corner cutting edge but in portions of the peripheral cutting edge and end cutting edge. Thereby, a local change in chip discharge performance can be prevented reliably, thereby achieving smoother and more stable cutting.

Meanwhile, the portion which is formed in the shape of the twist face as described above may be formed in the groove bottom face of the chip breaker formed on the side of the side ridge portion of the rake face along the cutting edge. However, in a case where the groove bottom face of the chip breaker is formed in the shape of a twist face in this way, the radius of a convex circular arc formed by the corner cutting edge becomes small and the radius of the corner cutting edge becomes equal to or less than the width of the groove bottom face of the chip breaker, i.e., equal to or less than the groove width of the chip breaker. Then, since the center of the above convex circular arc is located within the groove bottom face of the chip breaker, there is a possibility that it becomes difficult to correctly form a twist face whose inclination toward the rear side in the end-mill rotational direction becomes gradually large as it approaches the center of the convex circular arc.

Here, in such a case, it is also conceivable that the center of the convex circular arc formed by the corner cutting edge is not located on the groove bottom face, for example, by making the groove width of the whole chip breaker small. However, while the radius of the corner cutting edge is reduced as described above, the groove width becomes smaller. Therefore, there is a possibility that the groove wall face of the chip breaker which rises on the side of the groove bottom face opposite the cutting edge may approach the cutting edge excessively, and chips may be clogged slightly, and consequently an increase in cutting resistance may occur.

Thus, as such a chip breaker, in a case where the portion of the rake face on the side of the side ridge portion along the cutting edge is formed with an end cutting edge side chip breaker having a groove bottom face connected to the end cutting edge, an outer peripheral cutting edge side chip breaker having a groove bottom face connected to the outer peripheral cutting edge, and a corner cutting edge side chip breaker having a groove bottom face connected to the corner cutting edge. Particularly in a case where the radius of the convex circular arc formed by the corner cutting edge is small as described above, it is desirable that the groove bottom face of the end cutting edge side chip breaker is made to protrude more than the groove bottom face of the outer peripheral cutting edge side chip breaker, and the groove bottom face of the corner cutting edge side chip breaker is formed in the shape of a fan or a circular arc along the corner cutting edge so as to form a shallow ridge as it approaches the groove bottom face of the end cutting edge side chip breaker from the groove bottom face of the outer peripheral cutting edge side chip breaker, and the portion of the side ridge portion along at least a portion of the corner cutting edge in the groove bottom face of the corner cutting edge side chip breaker is formed in the shape of the twist face as described above.

That is, in a case where the groove bottom face of the above corner cutting edge side chip breaker which is formed in the shape of the above twist face is formed in the shape of a fan along the corner cutting edge in this way, even if the center of the convex circular arc formed by the corner cutting edge is on the groove bottom face, the center of the fan is provided substantially along an intersection portion between the groove bottom face of the chip breaker, and the groove wall face. Thereby, this groove bottom face can be formed in the shape of a twist face which does not obstruct discharge of chips. Additionally, in a case where the groove bottom face of the corner cutting edge side chip breaker is formed in the shape of a circular arc, i.e., in the shape of a strip which is sandwiched and curved between the convex circular arc formed by the corner cutting edge and a convex circular arc having a smaller radius than the radius of the corner cutting edge, the groove bottom face does not exist at the center of the convex circular arc formed by the corner cutting edge. Thus, the groove bottom face can be correctly formed in the shape of the twist face as described above. Also, since the groove bottom face of the end cutting edge side chip breaker is made to protrude more than the groove bottom face of the outer peripheral cutting edge side chip breaker, the groove bottom face of the corner cutting edge side chip breaker is made to form a shallow ridge as it approaches the groove bottom face of the end cutting edge side chip breaker from the groove bottom face of the outer peripheral cutting edge side chip breaker as described above. Thereby, it is possible to reliably set the cutting edge inclination angle of the corner cutting edge to a positive angle.

Additionally, in a case where the groove bottom face of the end cutting edge side chip breaker is made to protrude more than the groove bottom face of the outer peripheral cutting edge side chip breaker in this way, and these bottom faces are connected by the groove bottom face of the corner cutting edge side chip breaker which gradually rises as it approaches the groove bottom face of the end cutting edge side chip breaker from the groove bottom face of the outer peripheral cutting edge side chip breaker (in a case where the groove bottom face of the end cutting edge side chip breaker and the groove bottom face of the outer peripheral cutting edge side chip breaker are connected via such a groove bottom face of the corner cutting edge side chip breaker), it is desirable that the groove bottom face of the corner cutting edge side chip breaker is formed at least on the side of the cutting edge so as to be smoothly connected with the groove bottom face of the end cutting edge side chip breaker and the groove bottom face of the outer peripheral cutting edge side chip breaker. That is, when these groove bottom faces do not connect smoothly, but intersect each other, for example, at an angle portion having an angle, the cutting edge inclination angle and the rake angle change abruptly in the portion. Therefore, there is a possibility that chip discharge performance is impaired. Additionally, since such an angle portion tends to get chipped, it is not desirable in terms of tool life.

Moreover, generally, the positive cutting edge inclination angle when considered as the end cutting edge becomes a negative rake angle when considered as the peripheral cutting edge. Thus, when the radius of the convex circular arc formed by the corner cutting edge as described above is small, the distance between the outer peripheral side of the corner cutting edge and the end cutting edge side of the corner cutting edge becomes short. Therefore, when the cutting edge inclination angle on the side of the end cutting edge of the corner cutting edge is increased toward a positive angle, the flow of chips on the side of the adjacent outer peripheral cutting edge is also affected. As a result, there is a possibility that an increase in cutting resistance occurs on the side of the outer peripheral cutting edge. Accordingly, in a case where the groove bottom face of the corner cutting edge side chip breaker is formed so as to have the shape of a twist face as the portion of the rake face on the side of the side ridge portion along at least a portion of the corner cutting edge, it is desirable that the corner cutting edge is such that the cutting edge inclination angle on the side of the end cutting edge is set to a small positive angle, and the cutting edge inclination angle increases as it approaches the outer peripheral cutting edge from the end cutting edge.

Meanwhile, it is desirable that the portion of the rake face on the side of the side ridge portion along at least a portion of the corner cutting edge is formed with a recess which is recessed with respect to the rake face at a distance from the cutting edge, including the case where the groove bottom face of the end cutting edge side chip breaker is made to protrude more than the groove bottom face of the outer peripheral cutting edge side chip breaker as described above.

That is, when such a recess is formed, the contact of chips with the rake face is suppressed or the pressure caused by contact becomes weak, so that cutting resistance can be reduced. Moreover, since this recess is spaced apart from the cutting edge, the portion of the rake face on the side of the side ridge portion along at least a portion of the corner cutting edge is left between the recess and the cutting edge. As a result, since the recess is lower than the rake face of this portion, the recess does not hinder discharge of chips which flow on the rake face.

In addition, the invention can also be applied to a so-called solid radius end mill in which a chip discharge flute or a gash is formed at a tip portion of an end mill body, a wall face which faces an end-mill rotational direction is used as a rake face, and a cutting edge is directly formed in this rake face. However, the invention can also be applied to, for example, an indexable radius end mill, in which a cutting insert to be detachably attached to an insert mounting seat formed at a tip portion of the end mill body. The cutting insert has a flat plate-shaped insert body, wherein the insert body is formed with the rake face and the cutting edge.

EFFECTS OF THE INVENTION

As described above, according to the invention, it is possible to provide an end mill capable of preventing cutting resistance from increasing locally in a specific portion of the corner cutting edge and preventing cutting edge strength from being impaired, thereby suppressing vibration of the end mill body at the time of cutting, and capable of preventing any damage, such as fracturing or chipping, from occurring, securing favorable chip discharge performance to promote stable cutting to improve machining accuracy, and extending the life of tools.

BRIEF DESCRIPTION OF THE DRAWINGS

FIG. 8(A) is a plan view, FIG. 8(B) is a front view, FIG. 8(C) is a view as seen from an end-mill rotational direction T perpendicular to a straight line X which connects an intersection point between an end cutting edge and a corner cutting edge, and a centerline C of an insert body in FIG. 8(B), FIG. 8(D) is a view seen from a direction perpendicular to a tangential line of a cutting edge in the intersection point of FIG. 8(C), FIG. 8(E) is a sectional view (ZZ sectional view in FIG. 8(D)) orthogonal to the cutting edge at the intersection point of FIG. 8(C), and FIG. 8(F) is a YY sectional view of the cutting insert of FIG. 8(C).

FIG. 9(A) is a plan view, FIG. 9(B) is a front view, FIG. 9(C) is a view as seen from an end-mill rotational direction T perpendicular to a straight line X which connects a point on an bisector L (a protruding end of a corner cutting edge) of the corner cutting edge and a centerline C of an insert body in FIG. 9(B), FIG. 9(D) is a view seen from a direction perpendicular to a tangential line of the cutting edge in the point (the protruding end of the corner cutting edge) of FIG. 9(C), FIG. 9(E) is a sectional view (ZZ sectional view in FIG. 9(D)) orthogonal to the cutting edge at the point of FIG. 9(C), and FIG. 9(F) is a YY sectional view of the cutting insert of FIG. 9(C).

FIG. 10(A) is a plan view, FIG. 10(B) is a front view, FIG. 10(C) is a view as seen from an end-mill rotational direction T perpendicular to a straight line X which connects an intersection point between an outer peripheral cutting edge and a corner cutting edge, and a centerline C of an insert body in FIG. 10(B), FIG. 10(D) is a view seen from a direction perpendicular to a tangential line of a cutting edge in the intersection point of FIG. 10(C), FIG. 10(E) is a sectional view (ZZ sectional view in FIG. 10(D)) orthogonal to the cutting edge at the intersection point of FIG. 10(C), and FIG. 10(F) is a YY sectional view of the cutting insert of FIG. 10(C).

FIG. 11(A) is a plan view, FIG. 11(B) is a front view, FIG. 11(C) is a view as seen from an end-mill rotational direction T perpendicular to a straight line X which connects a point on the rear end side of the outer peripheral cutting edge and a centerline C of an insert body in FIG. 11(B), FIG. 11(D) is a view seen from a direction perpendicular to a tangential line of a cutting edge in the point of FIG. 11(C), and FIG. 11(E) is a sectional view (ZZ sectional view of the cutting insert of FIG. 11(D)) orthogonal to the cutting edge at the point of FIG. 11(C).

FIG. 24(A) is a plan view, FIG. 24(B) is a front view, FIG. 24(C) is a view as seen from an end-mill rotational direction T perpendicular to a straight line X which connects an intersection point between an end cutting edge and a corner cutting edge, and a centerline C of an insert body in FIG. 24(B), FIG. 24(D) is a view seen from a direction perpendicular to a tangential line of a cutting edge in the intersection point of FIG. 24(C), FIG. 24(E) is a sectional view (ZZ sectional view of the cutting insert of FIG. 24(D)) orthogonal to the cutting edge at the intersection point of FIG. 24(C), and FIG. 24(F) is an enlarged sectional view of a Y portion in FIG. 24(E).

FIG. 25(A) is a plan view, FIG. 25(B) is a front view, FIG. 25(C) is a view as seen from an end-mill rotational direction T perpendicular to a straight line X which connects a point on an bisector L (a protruding end of a corner cutting edge) and a centerline C of an insert body in FIG. 25(B), FIG. 25(D) is a view seen from a direction perpendicular to a tangential line of the cutting edge in the point of FIG. 25(C), FIG. 25(E) is a sectional view (ZZ sectional view of the cutting insert of FIG. 25(D) orthogonal to the cutting edge at the point of FIG. 25(C), and FIG. 25(F) is an enlarged sectional view of a Y portion in FIG. 25(E).

FIG. 26(A) is a plan view, FIG. 26(B) is a front view, FIG. 26(C) is a view as seen from an end-mill rotational direction T perpendicular to a straight line X which connects an intersection point between an outer peripheral cutting edge and a corner cutting edge, and a centerline C of an insert body in FIG. 26(B), FIG. 26(D) is a view seen from a direction perpendicular to a tangential line of a cutting edge in the intersection point of FIG. 26(C), FIG. 26(E) is a sectional view (ZZ sectional view of the cutting insert of FIG. 26(D)) orthogonal to the cutting edge at the intersection point of FIG. 26(C), and FIG. 26(F) is an enlarged sectional view of a Y portion in FIG. 26(E).

EXPLANATION OF REFERENCES

Figure 1:
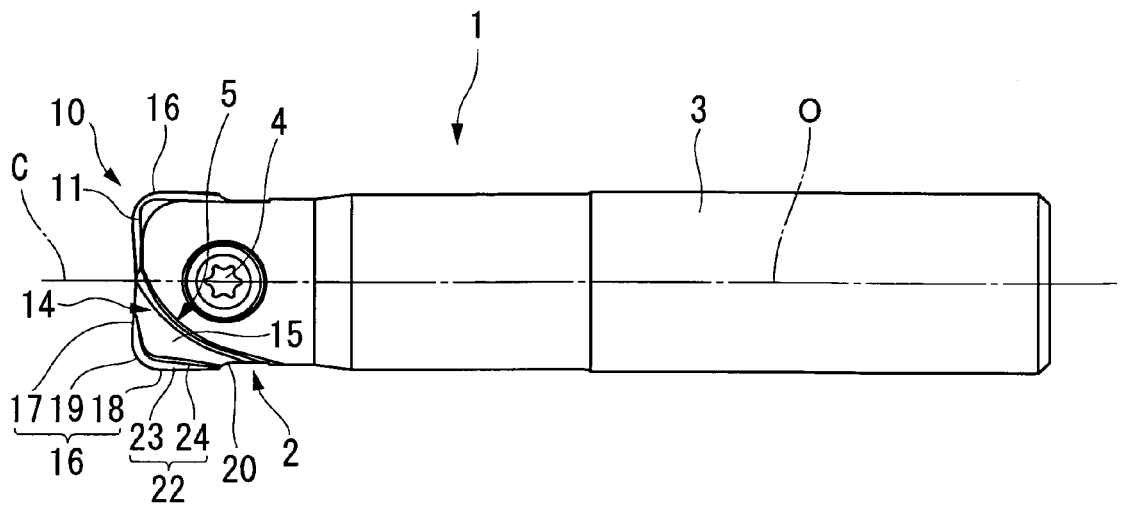
FIG. 1 is a plan view showing one embodiment of a radius end mill of the invention.

1 End mill body
2 Insert mounting seat
5 Chip discharge flute
10 Cutting insert
11 Insert body
14 Gash
15 Rake face
16 Cutting edge
17 End cutting edge
18 Outer peripheral cutting edge
19 Corner cutting edge
22 Chip breaker
22A End cutting edge side chip breaker
22B Outer peripheral cutting edge side chip breaker
22C Corner cutting edge side chip breaker
23 Groove bottom face of the chip breaker 22
23A Groove bottom face of the end cutting edge side chip breaker 22A
23B Groove bottom face of the outer peripheral cutting edge side chip breaker 22B 23C Groove bottom face of the corner cutting edge side chip breaker 22C 24 Groove wall face of the chip breaker 22

25 Step of the groove bottom face 23B and the groove bottom face 23C

26 Recess

O Axis of the end mill body 1

C Centerline of the Insert body 11

T End-mill rotational direction

L Bisector of Corner cutting edge 19

M Intersection ridgeline with the rake face 15 and the groove bottom face 23

λ Cutting edge inclination angle

γ Normal rake angle (Right rake angle)

θ Angle of inclination of the groove bottom face 23 in sectional view of the insert body which crosses the chip breaker 22

BEST MODE FOR CARRYING OUT THE INVENTION

Figure 2:
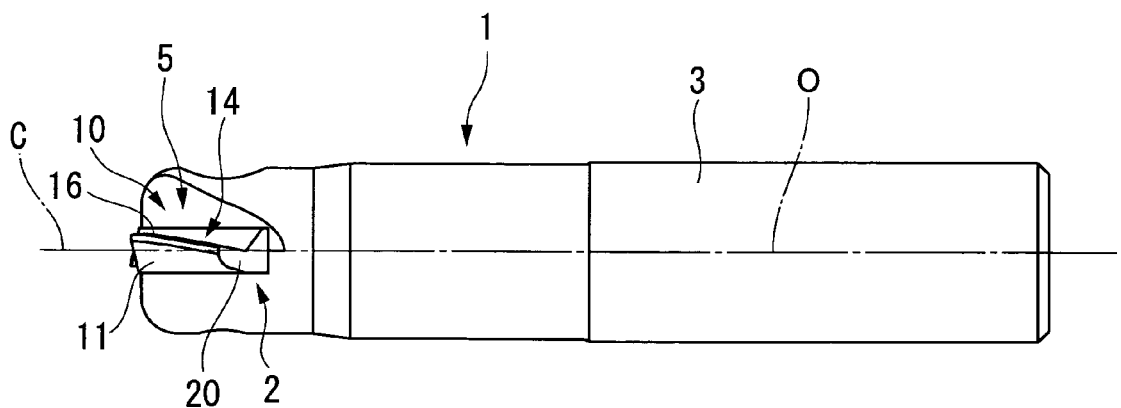
FIG. 2 is a side view of the radius end mill of the embodiment shown in FIG. 1.
Figure 3:
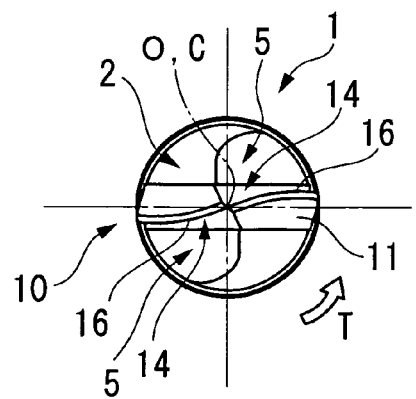
FIG. 3 is a front view of the radius end mill of the embodiment shown in FIG. 1.

FIGS. 1 to 11 show one embodiment when the invention is applied to the above-described indexable radius end mill. That is, the radius end mill of this embodiment is configured such that a cutting insert 10 of a first embodiment of the invention as shown in FIGS. 4 to 7 to be detachably attached to an insert mounting seat 2 formed at a tip portion of a substantially columnar end mill body 1 having an axis O as its center as shown in FIGS. 1 to 3. In the radius end mill, a shank portion 3 on the side of a rear end of the end mill body 1 is attached to a spindle of a machine tool, and is fed in a direction in which the shank portion intersects the axis O while being rotated in an end-mill rotational direction around the axis O indicated by reference numeral T in FIG. 3, so that a work material can be cut by the cutting insert 10.

Here, the end mill body 1 is formed of steel or the like, and the insert mounting seat 2 is formed such that the tip portion of the end mill body 1 is cut away along a plane including an axis O by a recess groove which is angularly U-shaped in side view as shown in FIG. 2, and is opened to the tip side. The cutting insert 10 is inserted into the insert mounting seat 2 formed in this way, and then fixed and attached such that a clamp screw 4 inserted orthogonally to the axis O perpendicular to the plane from one jaw portion of the tip portion of the end mill body 1 split in the shape of a jaw by the insert mounting seat 2 is screwed into the other jaw portion of the tip portion of the end mill body 1 through the cutting insert 10 and thereby sandwiched between the pair of jaw portions.

In the cutting insert 10 of this embodiment, the insert body 11 is formed in the shape of a substantially oblong flat plate as shown in FIGS. 4 to 7 from a hard material, such as cemented carbide, and the insert body 11 is formed in the symmetry of rotation of 180° with respect to a centerline C passing through the center thereof in its thickness direction (vertical direction in FIGS. 6 and 7), and is attached to the insert mounting seat 2 such that the centerline C become coaxial with the axis O.

Here, the thickness of the insert body 11 is set to a size such that the insert body can be fitted into the angularly U-shaped insert mounting seat 2, and a rear end face (upper side in FIG. 5, and a face which faces the right side in FIG. 6) 12 of the insert body 11 is formed as a flat face vertical to the centerline C. The insert body 11 is fitted into the insert mounting seat 2 in this way, and the rear end face 12 is brought into close contact with a bottom face which faces the tip side of the insert mounting seat 2, and is seated on the insert mounting seat 2. Additionally, an insertion hole 13 through which the clamp screw 4 is inserted is formed in a position closer to the rear end face 12 than the middle of the insert body in the direction of the centerline C in the insert body 11 so as to pass through the insert body 11 in the thickness direction perpendicular to the centerline C.

In a state (hereinafter, simply referred to as an attached state) where the insert body has been attached to the insert mounting seat 2 in this way, a gash 14 is formed on the side (the right side in FIG. 5) of each of a pair of oblong side faces of the insert body 11 which faces the end-mill rotational direction T so as to cut away a tip outer peripheral portion of the side face in the end mill body 1 in the thickness direction. In the outer periphery of the tip portion of the end mill body 1, a pocketlike chip discharge flute 5 is formed on each jaw portion of the pair of jaw portions, and the gash 14 is provided on a tip side of the chip discharge flute 5. In this embodiment, the wall face of the gash 14 which faces the end-mill rotational direction T is used as a rake face 15, and a cutting edge 16 is formed at a side ridge portion of the rake face 15.

The cutting edge 16, in the attached state, is composed of an end cutting edge 17 which is located at a side ridge portion on the tip side of the rake face 15 and extends toward a radial direction with respect to the axis O, an outer peripheral cutting edge 18 which is located at a side ridge portion on the outer peripheral side of the rake face 15 and extends in the direction of the axis O, and a corner cutting edge 19 which is located at a corner side ridge portion on the tip outer peripheral side formed by the end cutting edge 17 and the outer peripheral cutting edge 18 and is smoothly connected to both the end cutting edge 17 and the outer peripheral cutting edge 18. The corner cutting edge 19 is formed substantially in the shape of a ¼ convex circular arc as seen from a direction facing the rake face 15. In this regard, the end cutting edge 17 is inclined so as to be slightly lower toward the rear end side in the direction of the axis O as it approaches the inner peripheral side in the radial direction of the end mill body 1 in the attached state, and is thereby adapted such that a concavity angle is given to the end cutting edge 17.

Additionally, the width of the insert body 11 in the direction orthogonal to the centerline C as seen from a direction opposing the rake face 15 is slightly reduced by one step via a stepped portion 20 on the side of the rear end face 12, and the outer peripheral cutting edge 18 extends so as to reach the stepped portion 20. Moreover, the wall face of the gash 14 which rises from the rake face 15 is convexly curved toward the cutting edge 16 from the vicinity of an intersection point between the end cutting edge 17 and the centerline C toward a portion between the stepped portion 20 and the rear end face 12 as seen from the direction facing the rake face 15 as shown in FIG. 5 in this embodiment, and is formed in the shape of an inclined curve which is lower as it rises from the rake face 15 in the thickness direction.

In addition, the portions excluding the gashes 14 are formed as flat faces perpendicular to the rear end face 12 in the pair of oblong side faces of the insert body 11, and the thickness of the insert body 11 is set to the thickness between the flat faces, and the insertion hole 13 is also opened to the flat face portions. Additionally, the portion excluding the rear end face 12 and the portion in which the stepped portion 20 is formed from the rear end face 12 among four peripheral faces arranged between the pair of side faces is formed as a flank face 21 connected to the cutting edge 16 on the side of each side face, and the angle of relief is given so as to be gradually lower as it separates in the thickness direction from the cutting edge 16.

Figure 4:
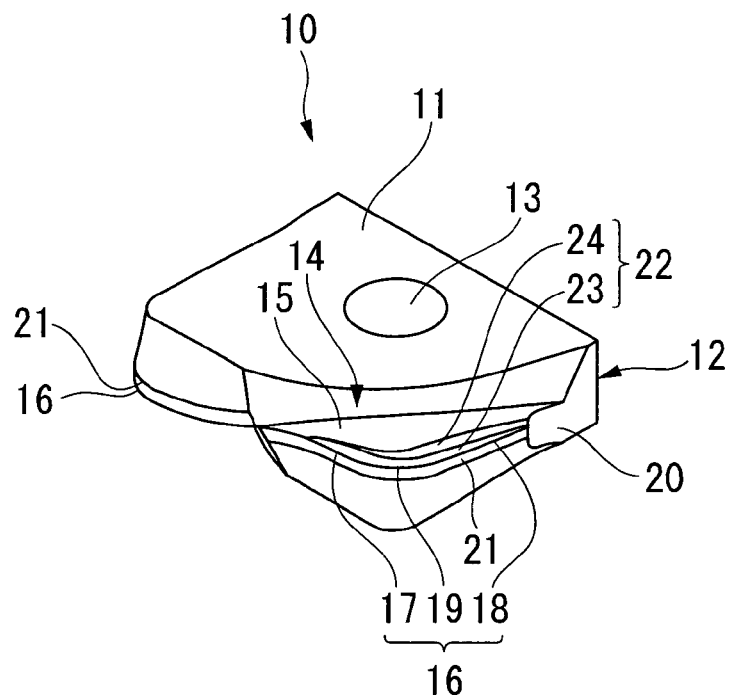
FIG. 4 is a perspective view showing a cutting insert of a first embodiment of the invention.
Figure 5:
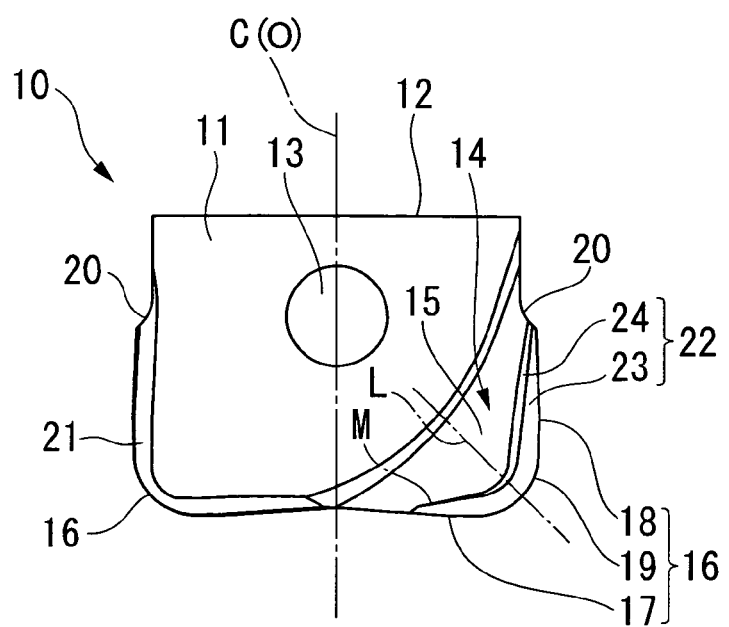
FIG. 5 is a plan view of the cutting insert of the embodiment shown in FIG. 4.

Meanwhile, the rake face 15 of the gash 14, as shown in FIG. 5, rises most substantially in the thickness direction on a bisector L of the corner cutting edge 19 which is formed in the shape of a ¼ convex circular arc as described above as seen from the direction facing the rake face 15, that is, on a straight line (a straight line intersects the centerline C at 45°) which connects the center of the ¼ convex circular arc and a protruding end of the corner cutting edge 19, and is formed in the shape of a convex curve which is lower in the thickness direction while being convexly curved as it separats from the bisector L (refer to FIG. 4). Additionally, the rake face 15 is formed so as to be gradually lower in the thickness direction as it separates from the cutting edge 16 in the direction of the bisector L.

Moreover, a chip breaker 22 is formed at least along the corner cutting edge 19 on the side of the side ridge portion in which the cutting edge 16 of the rake face 15 is formed. Particularly in this embodiment, the chip breaker 22, as shown in FIG. 5, reaches the corner cutting edge 19 from the middle of the end cutting edge 17 and further extends to the outer peripheral cutting edge 18, and is continuously formed along the cutting edge 16 over the total length of the outer peripheral cutting edge 18. Additionally, the chip breaker 22 is composed of a groove bottom face 23 which is recessed so as to be lower than the rake face 15 and is connected to the cutting edge 16, and a groove wall face 24 which rises from the groove bottom face 23 on the side of the groove bottom face 23 opposite the cutting edge 16 and is connected to the rake face 15. Accordingly, the cutting edge 16, as shown in FIGS. 4 and 5, is formed at an intersection ridgeline portion between the groove bottom face 23 and the flank face 21 in the portion in which the chip breaker 22 is formed.

In addition, the end cutting edge 17 is formed at an intersection ridgeline portion between the rake face 15 of the gash 14 and the flank face 21 on the inner peripheral side of the end cutting edge 17 where such a chip breaker 22 is not formed in the attached state. In this embodiment, an inner peripheral end of the end cutting edge is located on the axis O, that is, the cutting edges 16 which are respectively formed at the pair of side faces of the insert body 11 are adapted such that the end cutting edges 17 thereof are made to intersect each other on the centerline C (refer to FIGS. 5 and 7). Additionally, in this embodiment, the groove wall face 24 is formed in the shape of an inclined face which is lower as it rises toward the rake face 15 (refer to FIGS. 4 to 6).

Moreover, the chip breaker 22 is formed so as to be parallel to the corner cutting edge 19 in a portion along the corner cutting edge 19, that is, is formed so as to have a ¼ convex circular-arc shape which is substantially concentrical with a ¼ convex circular arc formed by the corner cutting edge 19 as seen from the direction facing the rake face 15, particularly, such that the groove bottom face 23 has a substantially constant width along the corner cutting edge 19.

Meanwhile, the chip breaker 22 is formed such that the groove width thereof becomes small at one or both ends of portions along the end cutting edge 17 and the outer peripheral cutting edge 18 from both ends of a portion along the corner cutting edge 19. In this embodiment, at both ends on the side of the end cutting edge 17 and the outer peripheral cutting edge 18, the chip breaker is adapted such that the groove width thereof gradually becomes smaller as it separates from the corner cutting edge 19, particularly, such that the width of the groove bottom face 23 gradually becomes smaller.

Moreover, at both ends of the chip breaker 22 formed in this way, the chip breaker 22 is formed such that the groove bottom face 23 rises so as to connect with the rake face 15 in a direction along the end cutting edge 17 or the outer peripheral cutting edge 18 at each end, or is formed such that the groove bottom face 23 extends so as to be parallel to the rake face 15, and the chip breaker 22 is open at the end. Here, the chip breaker 22 in this embodiment rises at the end on the side of the end cutting edge 17 such that the groove bottom face 23 connects with the rake face 15, and is formed at the end on the side of the outer peripheral cutting edge 18 such that the groove bottom face 23 extends parallel to the rake face 15 and the chip breaker 22 is open.

That is, the chip breaker 22 is adapted at the end on the side of the end cutting edge 17 such that the groove bottom face 23 relatively rises gradually toward the rake face 15 and rises as the end cutting edge 17 approaches the inner peripheral side of the end mill body 1 in the attached state, and on the contrary, the groove wall face 24 gradually becomes smaller and no longer reaches an inner peripheral end of the chip breaker 22, and on the inner peripheral side of the inner peripheral end, the groove bottom face 23 intersects and connects with the rake face 15 at, for example, an obtuse angle of about 178°, and the width of the groove bottom face 23 gradually becomes smaller as it approaches the inner peripheral side apart from the corner cutting edge 19 as described above such that an intersection ridgeline M (refer to FIG. 5) intersects the inner peripheral side of the end cutting edge 17. In this regard, the groove bottom face 23 in the insert body 11 is formed in the shape of a convex curve which is lower in the thickness direction while being convexly curved as it approaches the end cutting edge 17 and the outer peripheral cutting edge 18 apart from the bisector L in the corner cutting edge 19 like the rake face 15 (refer to FIGS. 4 and 5).

Figure 6:
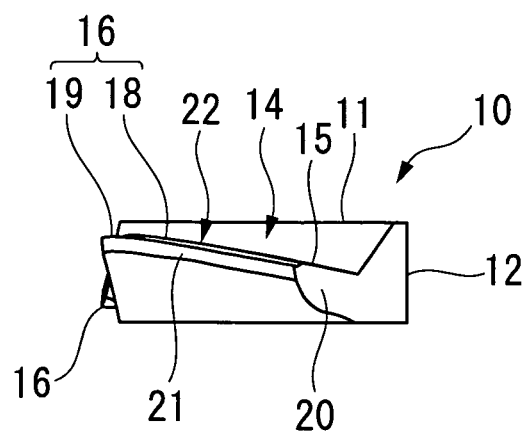
FIG. 6 is a side view of the cutting insert of the embodiment shown in FIG. 4.

On the other hand, as shown in FIGS. 4 to 6, at the end on the side of the outer peripheral cutting edge 18, the chip breaker 22 is adapted such that the width of the groove bottom face 23 becomes smaller and the groove width of the chip breaker 22 becomes smaller as the outer peripheral cutting edge 18 approaches the rear end side of the end mill body 1 in the attached state, but the groove wall face 24 extends with a substantially constant size. Accordingly, the groove bottom face 23 and the rake face 15 extend parallel to each other at a substantially constant distance in the thickness direction. At the rear end of the outer peripheral cutting edge 18, the chip breaker 22 is adapted such that the groove bottom face 23 and the groove wall face 24 extends to intersect the stepped portion 20 while the groove wall face 24 and the groove bottom face 23 are left as it is, and at the end on the side of the outer peripheral cutting edge 18, the chip breaker 22 is formed so as to be opened to the stepped portion 20.

Figure 7:
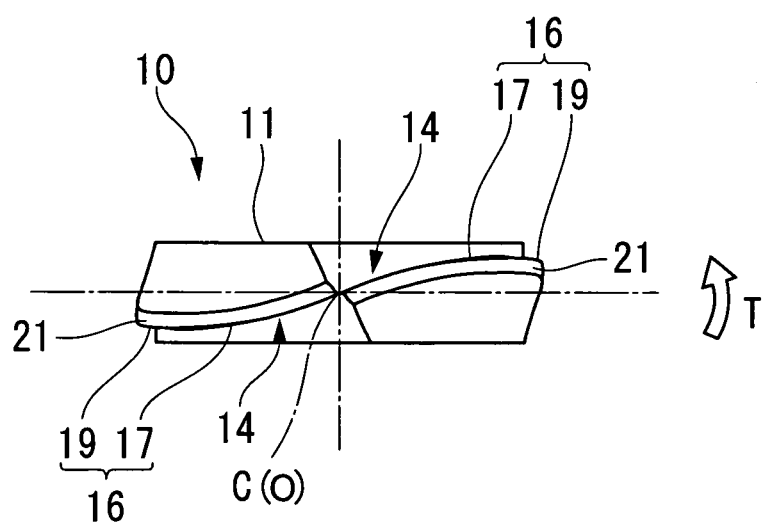
FIG. 7 is a front view of the cutting insert of the embodiment shown in FIG. 4.

By forming the chip breaker 22 in this way, the cutting edge 16 formed at the intersection ridgeline portion between the groove bottom face 23 of the chip breaker 22, and the flank face 21 is formed in the shape of a convex curve which is lower in the thickness direction of the insert body 11 while being convexly curved as the groove bottom face 23 separates from the bisector L as described above. Therefore, as shown in FIG. 7, the cutting edge is similarly formed in substantially the shape of a convex curve which is lower in the thickness direction as it separates from the protruding end of the corner cutting edge 19.

Figure 8:
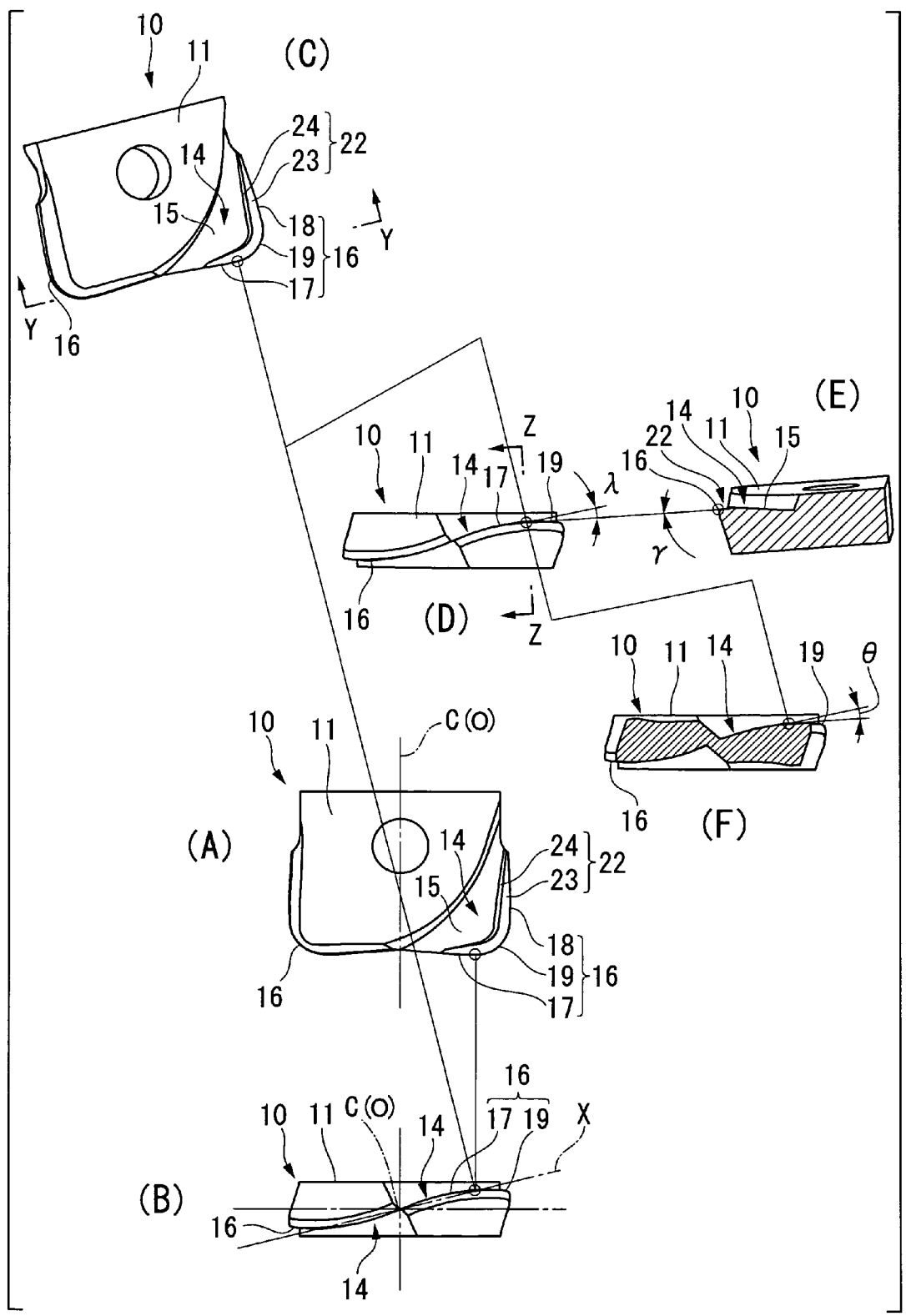
FIG. 8 is an explanatory view in a state where the cutting insert of the embodiment shown in FIG. 4 is attached to an end mill body, and specifically.
Figure 9:
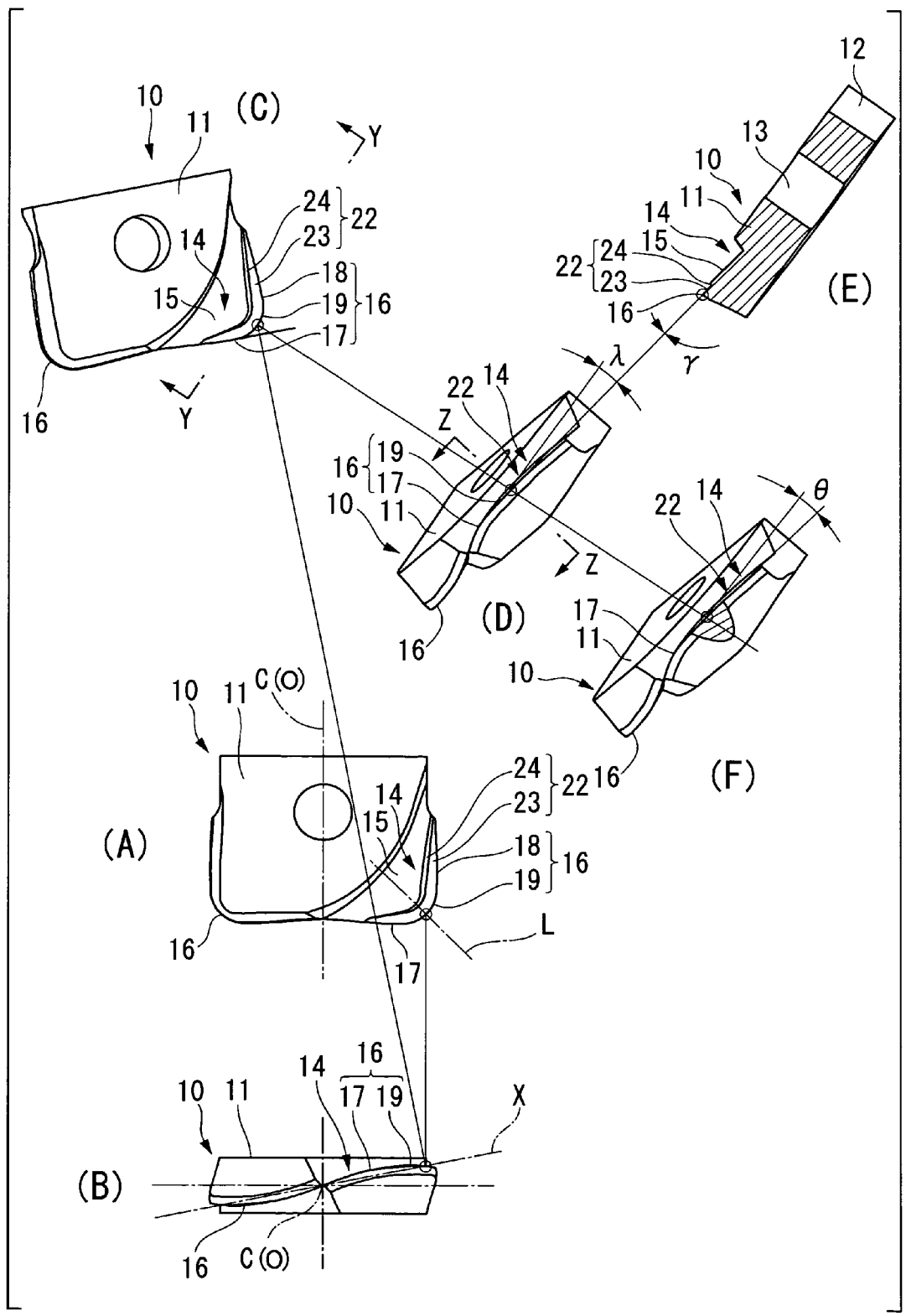
FIG. 9 is an explanatory view in a state where the cutting insert of the embodiment shown in FIG. 4 is attached to an end mill body, and specifically.
Figure 10:
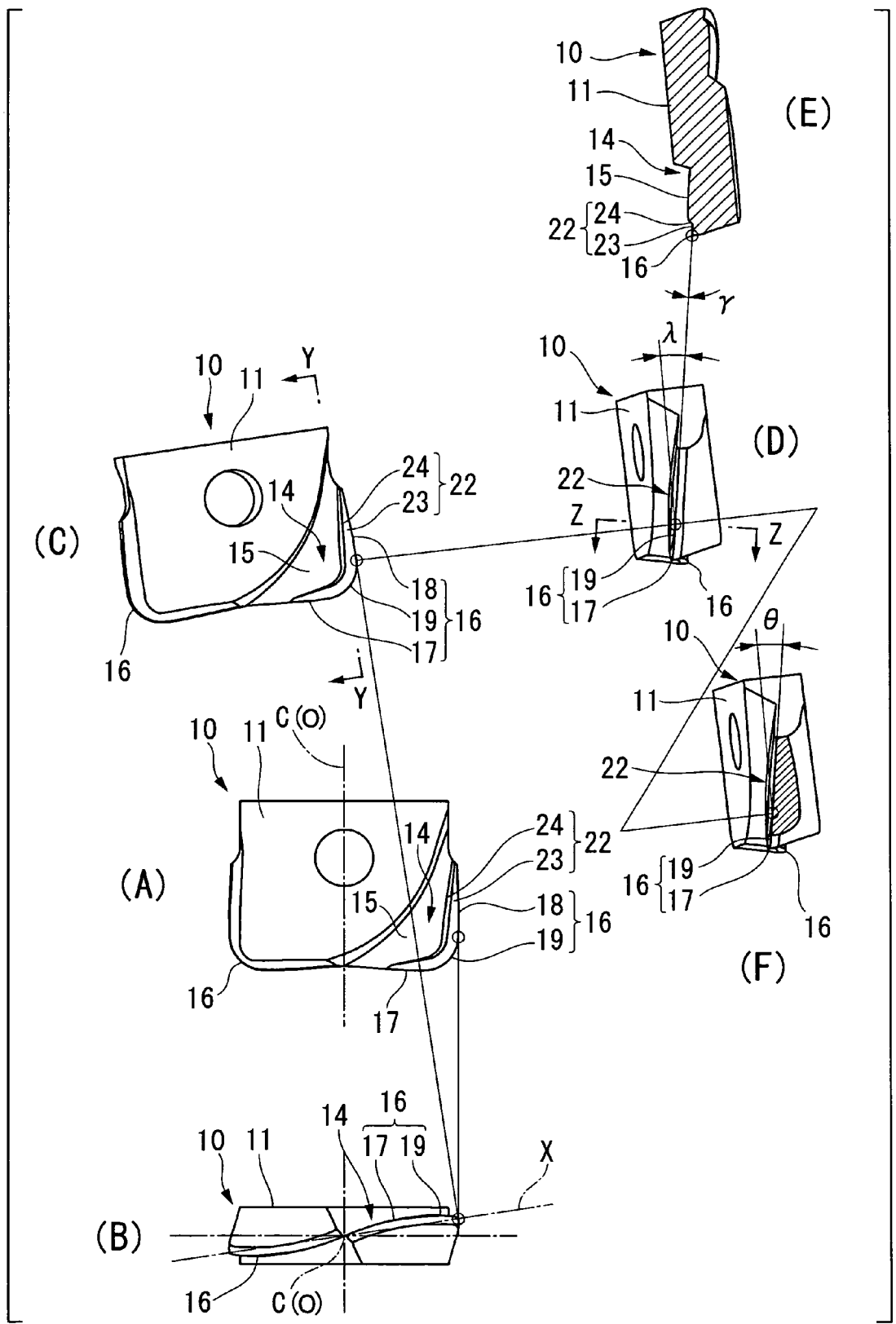
FIG. 10 is an explanatory view in a state where the cutting insert of the embodiment shown in FIG. 4 is attached to an end mill body, and specifically.
Figure 11:
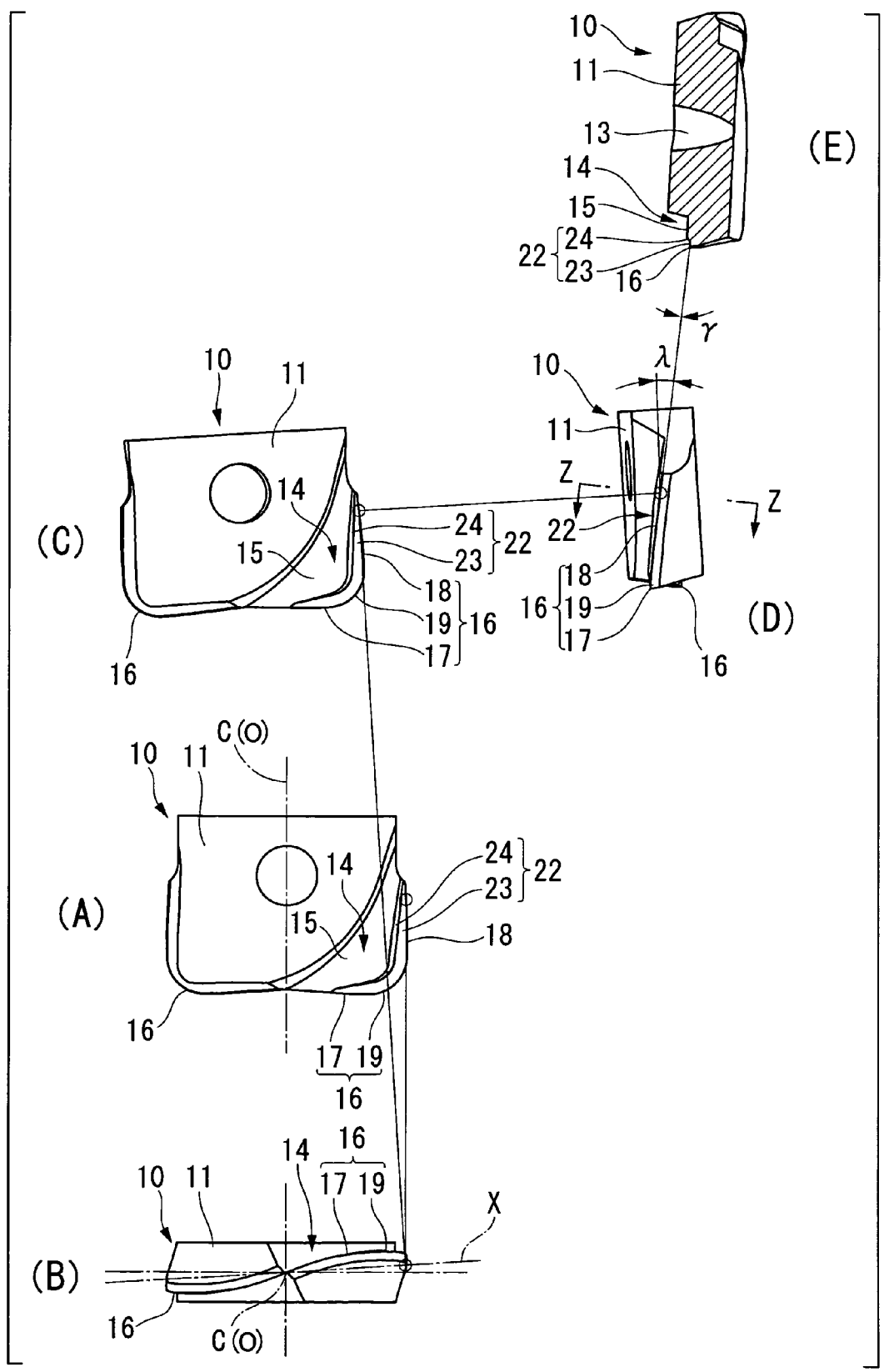
FIG. 11 is an explanatory view in a state where the cutting insert of the embodiment shown in FIG. 4 is attached to an end mill body, and specifically.
Figure 12:
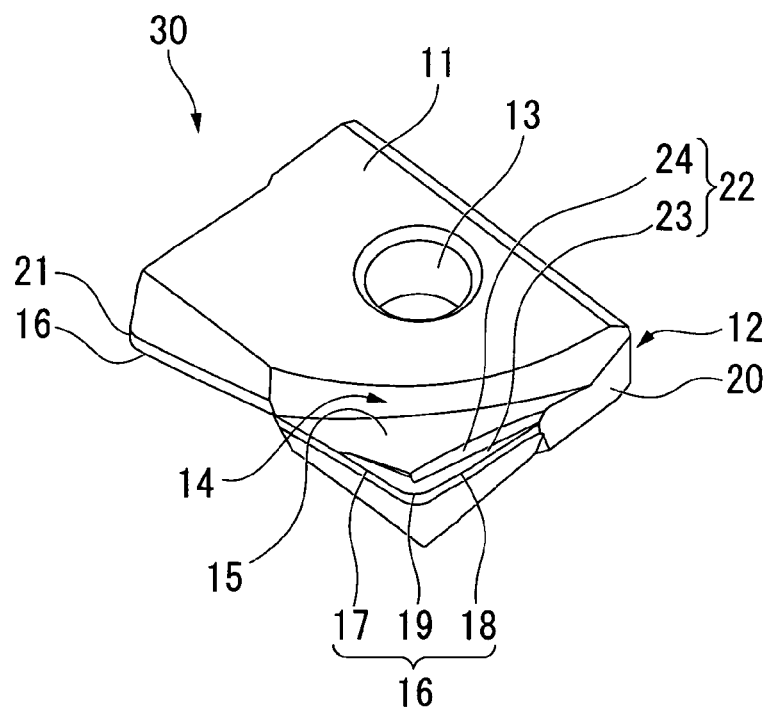
FIG. 12 is a perspective view showing a cutting insert of a second embodiment of the invention.

In the radius end mill of this embodiment in which such cutting insert 10 is attached to the end mill body 1, as shown in FIGS. 8(D), 9(D), and 10(D) of FIGS. 8 to 10, a positive cutting edge inclination angle X of the cutting edge 16 is given at least to the corner cutting edge 19. Moreover, the corner cutting edge 19 is formed so as to have a spiral shape which is twisted toward the rear side in the end-mill rotational direction T as it approaches the outer peripheral cutting edge 18 from the end cutting edge 17 in such an attached state. In this regard, the spiral formed by the corner cutting edge 19 becomes an annular spiral like a thread is obliquely wound along a partial doughnut-shaped or torus-shaped convex curve which is formed by a rotational locus when a convex circular arc formed by the corner cutting edge 19 as seen from the direction facing the rake face 15 is rotated around the axis O in the attached state.

Moreover, in this embodiment, as shown in FIG. 11(D), even in the outer peripheral cutting edge 18 or the end cutting edge 17, a positive cutting edge inclination angle λ is given to the cutting edge 16 in the attached state in a portion in which the chip breaker 22 is formed. Furthermore, the cutting edge inclination angle λ is set to a constant magnitude of, for example, 10°, including the corner cutting edge 19. In addition, by giving the constant cutting edge inclination angle λ fixed in this way, the outer peripheral cutting edge 18 is formed in a spiral shape which is twisted at a constant helix angle equal to the cutting edge inclination angle λ with respect to the axis O along a cylindrical face having the axis O as its center in the attached state.

Also, the cutting edge 16 is spirally twisted and formed such that the positive cutting edge inclination angle λ is given to the portion in which the chip breaker 22 is formed in this way. Accordingly, the groove bottom face 23 of the chip breaker 22, i.e., a portion on the side of the side ridge portion along at least a portion of the corner cutting edge 19 in the portion of the rake face 15 on the side of the side ridge portion is also inclined toward the rear side in the end-mill rotational direction T as it approaches the outer peripheral cutting edge 18 from the end cutting edge 17, and a slope toward the rear side in the end-mill rotational direction T is formed as a twist face which becomes gradually large as it approaches the center of a convex circular arc formed by the corner cutting edge 19 from the corner cutting edge 19. Particularly in this embodiment, the groove bottom face 23 is used as such a twist face over the total length of the corner cutting edge 19. Accordingly, in the cutting insert 10 of this embodiment, the groove bottom face 23 is inclined in a direction which is lower in the thickness direction as it approaches the outer peripheral cutting edge 18 from the end cutting edge 17 in a portion along at least a portion of the corner cutting edge 19, and is formed as a twist face whose inclination in a direction which is lower in the thickness direction becomes gradually large as it approaches the center of a convex circular arc formed by the corner cutting edge 19 from the corner cutting edge 19.

For example, FIG. 8(F), 9(F), and 10(F) of FIGS. 8 to 10 are sectional views of the insert body 11 which transverses the chip breaker 22 in a position on the side of the center of the convex circular arc by a certain distance from the corner cutting edge 19. The angle of inclination of the groove bottom face 23 in these cross-sections is represented by reference numeral θ in these drawings. As shown in these drawings, the angle of inclination θ is set to around 12° and is larger than the cutting edge inclination angle λ shown in FIGS. 8(D), 9(D), and 10(D). Additionally, in this embodiment, the portion of the groove bottom face 23 of the chip breaker 22 on the side of the outer peripheral cutting edge 18 is formed as the same twist face as a normal helix end mill, and the helix angle is equal to the cutting edge inclination angle λ, and the normal rake angle γ is made equal to that of the corner cutting edge 19. Additionally, the portion of the groove bottom face 23 on the side of the end cutting edge 17 is formed as a convex curve, and the radial rake angle thereof is equal to the cutting edge inclination angle λ in a connecting portion with the corner cutting edge 19, and the normal rake angle γ is made equal to that of the corner cutting edge 19. Thus, as shown in FIGS. 8(E), 9(E), 10(E), and 11 (E) of FIGS. 8 to 11 in the attached state, a constant normal rake angle γ of, for example, 0°, is given to the cutting edge 16 in the portion in which the chip breaker 22 is formed.

In the radius end mill of a configuration in which such cutting insert 10 to be detachably attached to the insert mounting seat 2 of the tip portion of the end mill body 1, the groove bottom face 23 of the rake face 15 on the side of the side ridge portion along at least a portion of the corner cutting edge 19 is formed in the shape of a twist face as described above. For this reason, even if the corner cutting edge 19 is formed in the shape of a spiral having the positive cutting edge inclination angle λ, the normal rake angle γ in a cross-section orthogonal to the corner cutting edge 19 in each part of the corner cutting edge 19 can be prevented from changing greatly. It becomes possible to avoid that the sharpness of the corner cutting edge 19 becomes blunt locally, and cutting resistance increases or a spot where cutting edge strength is impaired and fracture or chipping tends to occur is created.

Accordingly, according to the cutting insert 10 and radius end mill of the above configuration, cutting resistance can be prevented from increasing locally in the corner cutting edge 19, thereby suppressing that vibration is generated on the end mill body 1 at the time of cutting, and the groove bottom face 23 connected to the corner cutting edge 19 is inclined toward the rear side of the end-mill rotational direction T as it approaches the outer peripheral cutting edge 18 side from the end cutting edge 17, so that favorable chip discharge performance can be obtained, and smooth and stable cutting can be achieved. Additionally, since cutting edge strength can also be prevented from being impaired locally in the corner cutting edge 19, damage, such as fracturing or chipping, can be prevented from occurring at the cutting edge 16, and thereby, the life of the end mill or the cutting insert 10 can also be extended.

Particularly, in this embodiment, the normal rake angle γ of the cutting edge 16 is made constant in the portion in which the chip breaker 22 having the groove bottom face 23 which is formed in the shape of a twist face as described above, including the corner cutting edge 19. Accordingly, even if any spot of the cutting edge 16 of this portion is used for cutting, almost uniform sharpness and cutting edge strength can be secured, and more stable cutting can be performed. In addition, particularly in order to reliably uniformize the cutting edge strength of the cutting edge 16 in the portion in which the chip breaker 22 is formed, it is desirable that the flank face 21 connected to the cutting edge 16 in this portion is formed in the shape of a twist face which is twisted as it approaches the outer peripheral cutting edge 18 from the end cutting edge 17 such that the wedge angle in a cross-section orthogonal to the cutting edge 16 becomes constant.

Additionally, in the radius end mill of this embodiment, at least the corner cutting edge 19 has the positive cutting edge inclination angle λ, and is formed in a spiral shape which is twisted toward the rear side in the end-mill rotational direction T as it approaches the outer peripheral cutting edge 18 from the end cutting edge 17, particularly is formed in the shape of an annular spiral which is twisted along a partial doughnut-shaped or torus-shaped convex curve which is formed by a rotational locus when a convex circular arc formed by the corner cutting edge 19 as seen from the direction facing the rake face 15 is rotated around the axis O. For this reason, particularly when the corner cutting edge 19 is used, it is possible to disperse cutting resistance and promote efficient cutting. Additionally, chips generated and processed by the corner cutting edge 19 can be extruded and discharged toward the rear end side in the direction of the axis O, and chip discharge performance can be improved.

Moreover, in this embodiment, the cutting edge inclination angle λ in the portion in which the chip breaker 22 of the cutting edge 16 is formed, including the corner cutting edge 19, is made constant, and is set to a positive angle as it approaches the rear side in the end-mill rotational direction T from the end cutting edge 17 toward the outer peripheral cutting edge 18. Accordingly, in the cutting edge 16 in the portion in which the chip breaker 22 is formed, even if any part is used for cutting, it is possible to obtain an effect of efficient cutting and an improvement in chip discharge performance as described above. Additionally, even when a spot used for cutting on the cutting edge 16 varies continuously, it becomes possible to promote stable cutting.

Meanwhile, in this embodiment, the twist face of such a rake face 15 on the side of the side ridge portion along at least a portion of the corner cutting edge 19 is formed as the groove bottom face 23 of the chip breaker 22 provided at the side ridge portion of the rake face 15, and the chip breaker 22 is formed in the shape of a convex circular arc which extends parallel to the corner cutting edge 19 at the portion along the corner cutting edge 19. Thus, with the distance between the groove wall face 24 which rises from the groove bottom face 23 of the chip breaker 22 and the corner cutting edge 19 being set to an approximately constant distance in a direction along a convex circular arc formed by the corner cutting edge 19, the groove wall face 24 can be arranged so as to necessarily exist immediately on the side of the center of the convex circular arc of the corner cutting edge 19.

For this reason, chips generated on the side of the end cutting edge 17 or on the outer peripheral cutting edge 18 of the corner cutting edge 19, and as well as chips generated at the periphery of the protruding end of the corner cutting edge 19 on the bisector L can be made to collide with the groove wall face 24 reliably and rapidly, and thereby, the chips can be divided and processed smoothly by giving resistance to the chips and curling the chips in an outflow direction. In addition, the chip breaker 22 may not have a ¼ convex circular arc which is exactly concentrical with a ¼ convex circular arc formed by the corner cutting edge 19, and thus, the groove bottom face 23 may not have a constant width. For example, the width of the groove bottom face 23 may increase or decrease in some measure along the corner cutting edge 19 such that the width becomes slightly narrower on the side of the protruding end (on the side of the bisector L) of the corner cutting edge 19 than on the side of the end cutting edge 17 or on the side of the outer peripheral cutting edge 18 at both ends. That is, as described above, the groove wall face 24 may be arranged with respect to the corner cutting edge 19, so as to necessarily exist on the side of the center of the convex circular arc of the corner cutting edge 19.

Moreover, the chip breaker 22 rises at the end on the side of the end cutting edge 17 such that the groove bottom face 23 connects with the rake face 15 of the gash 14 in a direction along the end cutting edge 17, and is formed at the end on the side of the outer peripheral cutting edge 18 such that the groove bottom face 23 extends parallel to the rake face 15 in a direction along the outer peripheral cutting edge 18 and the chip breaker 22 is opened at the stepped portion 20. Accordingly, even at either end, smooth chip processing can be promoted on the chips generated over the corner cutting edge 19 or the chips generated beyond the corner cutting edge 19.

That is, the groove bottom face 23 of the chip breaker 22 rises and connects with the rake face 15 as described above at the end of the corner cutting edge 19 on the side of the end cutting edge 17. Therefore, a level difference does not occur between the groove bottom face 23 and the rake faces 15 or between the cutting edge 16 of the portion connected to the groove bottom face 23 and the cutting edge 16 of the portion connected to the rake face 15. Particularly in this embodiment, the groove bottom face 23 and the rake face 15 intersect each other at an obtuse angle near to a straight angle of about 178° at the intersection ridgeline M. Thus, there is no case that machining accuracy deteriorates due to such a level difference, or any damage, such as fracture or chipping, occurs at the cutting edge, and the life of tools is lowered. Additionally, for example, even if chips are generated and flow out so as to straddle the intersection ridgeline M, there is no case that the chips are divided along the outflow direction due to this step difference as in the case where a step is formed as described above. Accordingly, there is also no case that the chips which are divided in the outflow direction in this way are entangled together. Also, the chips can be smoothly processed by making the chips collide with the groove wall face 24 of the chip breaker 22 or the wall face of the gashes 14, thereby curling the chips in the outflow direction, and dividing the chips along a width direction of the chips which intersect this outflow direction.

Moreover, at the end on the side of the outer peripheral cutting edge 18 which the rake face 15 and the groove bottom face 23 extend parallel to each other in the direction along the cutting edge 16, and the chip breaker 22 is opened to the stepped portion 20, there is also no case that a level difference occurs in the cutting edge 16, and the groove wall face 24 which serves a step between the rake face 15 and the groove bottom face 23 is arranged so as to face the outflow direction of the chips. Thus, there is also no case that chips to be generated are divided in the outflow direction of the chips, and the chips are finely divided in a direction which intersects the outflow direction of the chips and are processed smoothly by making the chips collide with the groove wall face 24, thereby curling the chips.

Accordingly, according to this embodiment, machining accuracy can be further improved and the life of tools can be extended. Additionally, as well as chips generated by at least the corner cutting edge 19 formed by the chip breaker 22, chips generated by the cutting edge 16 on the side of any of the end cutting edge 17 and the outer peripheral cutting edge 18 can also be processed reliably and smoothly in the portion in which the chip breaker 22 is formed, and efficient cutting can be promoted.

Moreover, in this embodiment, the chip breaker 22 is adapted such that the groove width thereof gradually becomes smaller as it separates from the corner cutting edge 19 in a direction along the cutting edge 16 at both ends on the side of the end cutting edge 17 and the outer peripheral cutting edge 18. Thus, the distance between the cutting edge 16 and the groove wall face 24 of the chip breaker 22 can be made smaller at these both ends. Accordingly, on the side of the end cutting edge 17 of the corner cutting edge 19, even when the thickness of chips becomes thin in slot milling and the chips expand easily, it becomes possible to make chips collide with the groove wall face 24 in a position near the cutting edge 16, thereby curling the chips as small ones. Even when chips are thin, the chips can be divided and processed smoothly. Additionally, even when radial depth of cut is small in side milling or the thickness of chips becomes thin and the chips expand easily even on the side of the outer peripheral cutting edge 18 of the corner cutting edge 19, it becomes possible to achieve the same smooth processingas in the above case.

Moreover, in this embodiment, the chip breaker 22 extends to the outer peripheral cutting edge 18, and particularly, the end on the side of the outer peripheral cutting edge 18 reaches a termination end (rear end of the direction of axis O) of the outer peripheral cutting edge 18 in the stepped portion 20, that is, the chip breaker 22 is formed over the total length of the outer peripheral cutting edge 18. For this reason, when the portion of the corner cutting edge 19 from the outer peripheral cutting edge 18 to the outer peripheral cutting edge 18 is used, or even when cutting is performed only by the outer peripheral cutting edge 18 without using the end cutting edge 17 or the corner cutting edge 19 according to, for example, the shape of a work material or the like, favorable chip processability can be obtained.

Also, in the radius end mill and cutting insert 10 of the above configuration, at least the corner cutting edge 19 is formed at the intersection ridgeline portion between the groove bottom face 23 of the chip breaker 22 formed on the side of the side ridge portion of the rake face 15 and the flank face 21. Thus, it becomes possible to relatively easily form the groove bottom face 23 in the shape of a twist face as described above, or the corner cutting edge 19 which has a spiral shape at the positive cutting edge inclination angle λ, irrespective of the shape of the rake face 15. Additionally, it also becomes easy to make constant the cutting edge inclination angle λ or normal rake angle γ of the cutting edge 16 in the portion in which the chip breaker 22 is formed.

Figure 13:
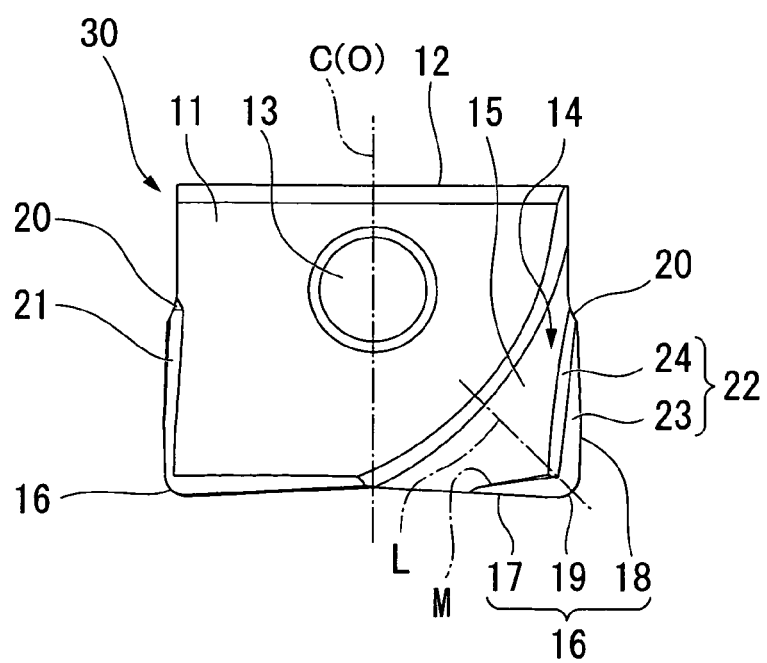
FIG. 13 is a plan view of the cutting insert of the embodiment shown in FIG. 12.
Figure 14:
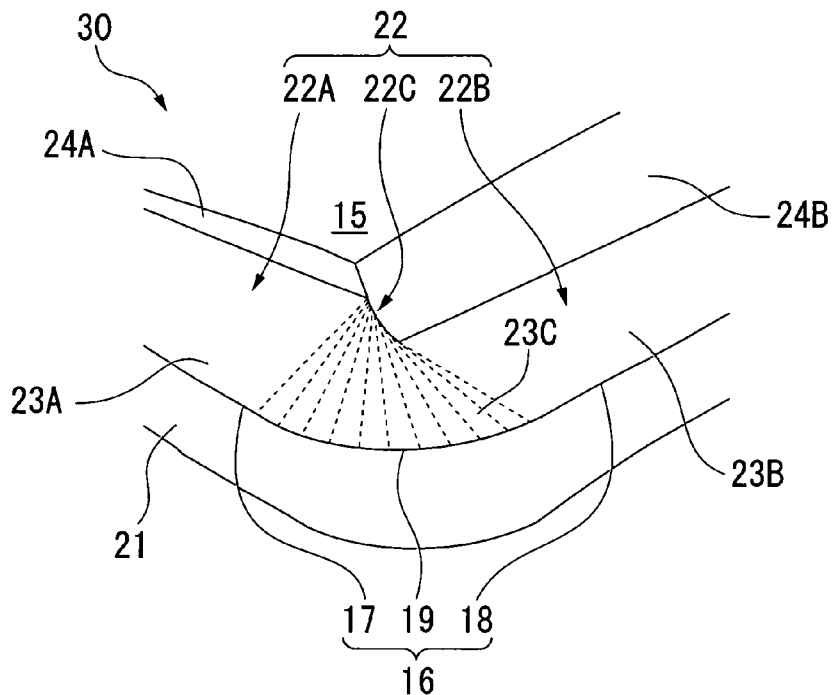
FIG. 14 is an enlarged perspective view of the periphery of a corner cutting edge of the cutting insert of the embodiment shown in FIG. 12.
Figure 15:
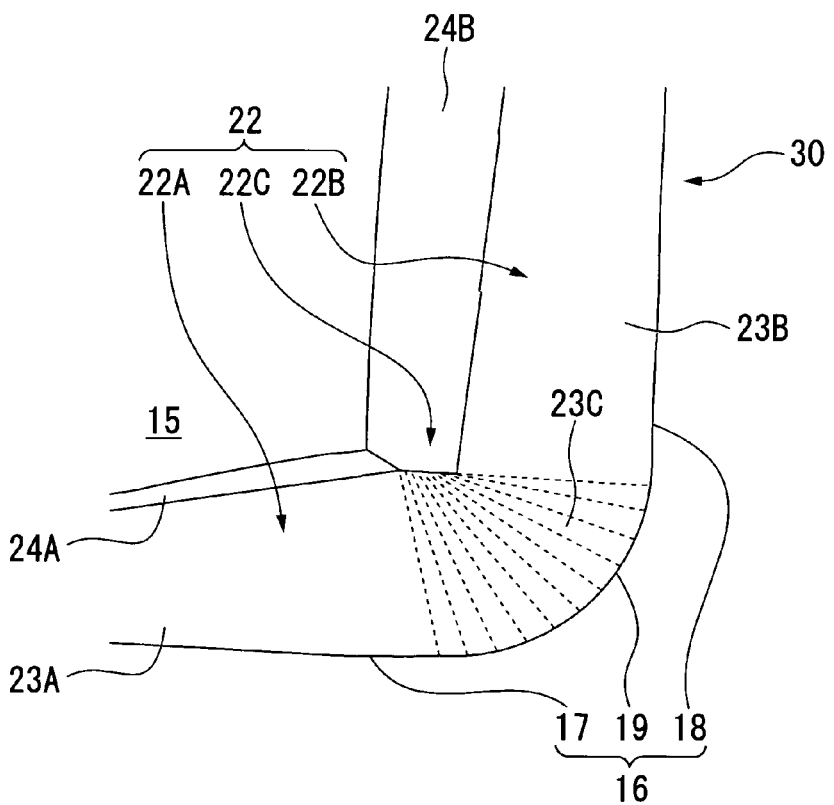
FIG. 15 is an enlarged plan view of the periphery of a corner cutting edge of the cutting insert of the embodiment shown in FIG. 12.
Figure 16:
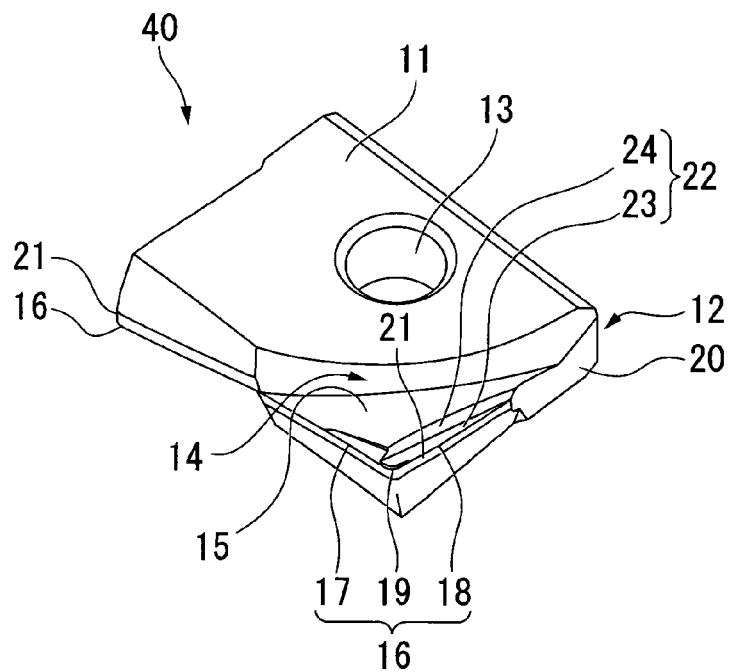
FIG. 16 is a perspective view showing a cutting insert of a third embodiment of the invention.
Figure 17:
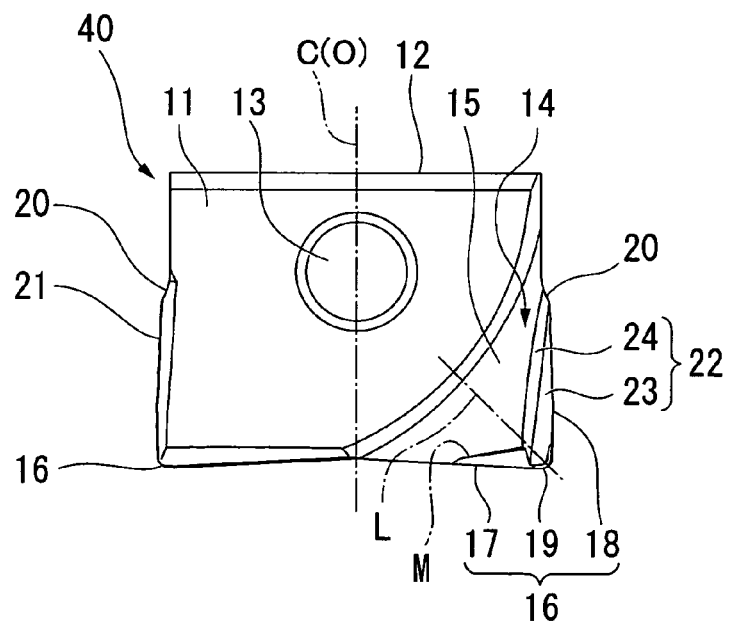
FIG. 17 is a plan view of the cutting insert of the embodiment shown in FIG. 16.

Next, FIGS. 12 to 15 show a cutting insert 30 of a second embodiment of the invention. In these drawings, portions common to those of the cutting insert 10 of the embodiment shown in FIG. 4 to FIG. 11 also including third and fourth embodiments which will be described later are denoted by the same reference numerals, and the description thereof is omitted. In this embodiment, as shown in FIG. 13 or 15, the radius of a convex circular arc formed by the corner cutting edge 19 is smaller than that of the first embodiment, and is equal to the groove width (the width of the groove bottom face 23) of the chip breaker 22 on the bisector L, or is, for example, about 1 mm or less which is smaller than the groove width. Accordingly, in such a cutting insert, the center of this convex circular arc may be located on the groove bottom face 23 of the chip breaker 22. Thus, as described above, it becomes difficult to form the groove bottom face 23 with a high level of accuracy in the shape of a twist face whose inclination toward the rear side in the end-mill rotational direction T gradually becomes larger as it approaches the center of the convex circular arc from the corner cutting edge 19.

Thus, in this second embodiment, as shown in FIGS. 14 and 15, the chip breaker 22 is constituted by an end cutting edge side chip breaker 22A in the portion of the end cutting edge 17 of the cutting edge 16, an outer peripheral cutting edge side chip breaker 22B in a portion along the outer peripheral cutting edge 18, and a corner cutting edge side chip breaker 22C in a portion along the corner cutting edge 19. Among these grooves, a groove bottom face 23A of the end cutting edge side chip breaker 22A is made to protrude in the thickness direction of the insert body 11 more than a groove bottom face 23B of the outer peripheral cutting edge side chip breaker 22B. Along with this, in this embodiment, the groove bottom face 23C of the chip breaker 22C is formed in the shape of a fan along the corner cutting edge 19 so as to form a shallow ridge in the thickness direction as it approaches the groove bottom face 23A of the end cutting edge side chip breaker 22A from the groove bottom face 23B of the outer peripheral cutting edge side chip breaker 22B, and the fan-shaped groove bottom face 23C of the corner cutting edge side chip breaker 22C is formed as a twist face whose inclination toward the rear side in the end-mill rotational direction T gradually becomes larger as it approaches the center of the convex circular arc.

Here, in this embodiment, the groove bottom face 23C of the corner cutting edge side chip breaker 22C rises toward the groove bottom face 23A from the groove bottom face 23B while being twisted spirally from the outer peripheral cutting edge side chip breaker 22B toward the end cutting edge side chip breaker 22A (as indicated by a broken line in FIGS. 14 and 15) as the position of the center of the fan shape is shifted from the outer peripheral cutting edge side chip breaker 22B toward the end cutting edge side chip breaker 22A so as to be smoothly connected to each of the groove bottom faces 23A and 23B of the end cutting edge side chip breaker 22A and the outer peripheral cutting edge side chip breaker 22B. That is, the center of the fan is provided roughly along an intersection portion between the groove bottom face 23 of the chip breaker 22 and the groove wall face 24.

In this regard, even in FIGS. 14 and 15 of this second embodiment and respective drawings of the third to fifth embodiments, broken lines shown in the drawings are given for description, and the groove bottom face 23C of the corner cutting edge side chip breaker 22C is formed in the shape of a curved face which is twisted smoothly. Additionally, a groove wall face of the end cutting edge side chip breaker 22A, and a groove wall face of the outer peripheral cutting edge side chip breaker 22B are respectively represented by reference numerals 24A and 24B in the drawings.

Accordingly, in a cutting insert 30 of a second embodiment, even if the radius of a convex circular arc formed by the corner cutting edge 19 is small as described above, and the center of the corner cutting edge 19 is located on the groove bottom face 23C of the corner cutting edge side chip breaker 22C, the groove wall face 24 of the chip breaker 22 projects toward the corner cutting edge 19, and thus, the flow of chips is not obstructed, and the groove bottom face 23C can be formed in the shape of a twist face whose inclination toward the rear side in the end-mill rotational direction T gradually becomes larger as it approaches the center of the convex circular arc from the corner cutting edge 19. Additionally, the groove bottom face 23C rises gradually as it approaches the groove bottom face 23A of the end cutting edge side chip breaker 22A from the groove bottom face 23B of the outer peripheral cutting edge side chip breaker 22B, and on the contrary, is gradually lower toward the outer peripheral cutting edge side chip breaker 22B from the end cutting edge side chip breaker 22A. Therefore, it becomes possible to reliably set the cutting edge inclination angle of the corner cutting edge 19 toward the positive angle.

In addition, in the second embodiment, the groove bottom face 23C of the corner cutting edge side chip breaker 22C is formed in the shape of a fan along the corner cutting edge 19 in this way. However, in a case where the radius of the corner cutting edge 19 is still smaller than this, similarly to a cutting insert 40 of a third embodiment of the invention shown in FIGS. 16 to 19, the groove bottom face 23C may be formed in the shape of a circular arc along the corner cutting edge 19, i.e., in the shape of a strip which is sandwiched between the convex circular arc formed by the corner cutting edge 19 and a circular arc having a smaller radius than the corner cutting edge 19 and which is curved with an almost constant width.

Figure 18:
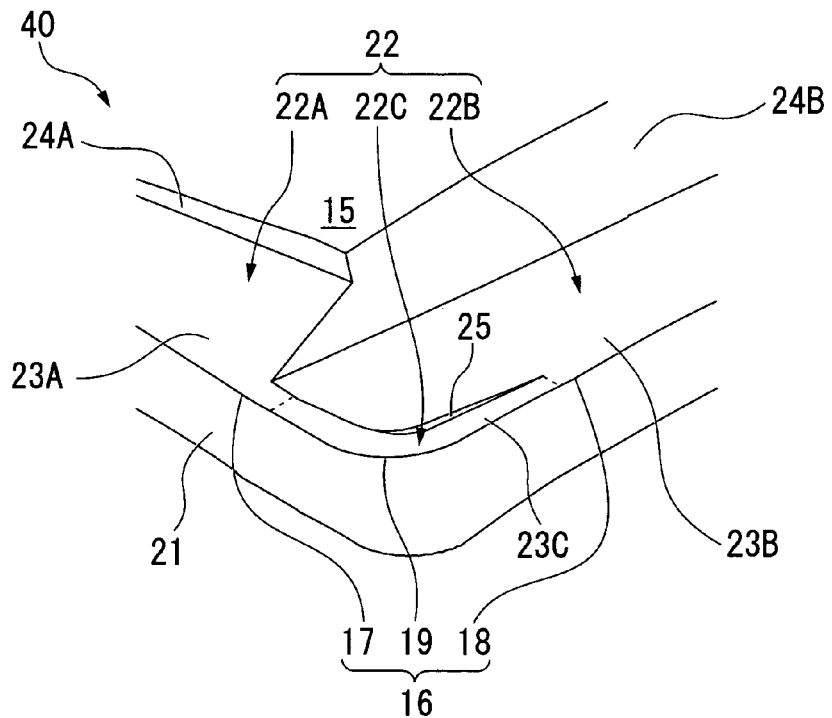
FIG. 18 is an enlarged perspective view of the periphery of a corner cutting edge of the cutting insert of the embodiment shown in FIG. 16.
Figure 19:
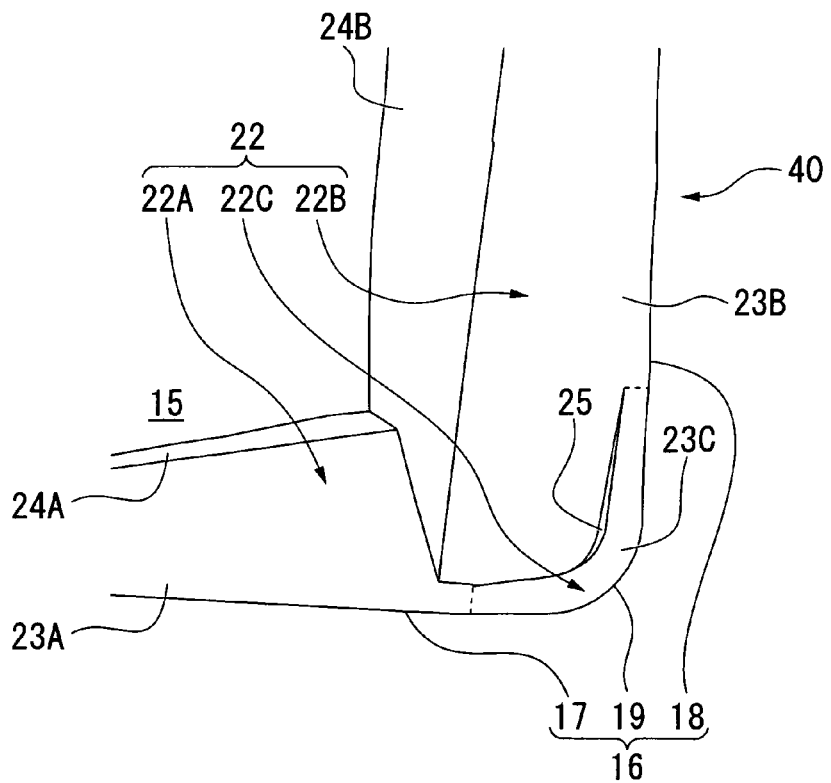
FIG. 19 is an enlarged plan view of the periphery of a corner cutting edge of the cutting insert of the embodiment shown in FIG. 16.
Figure 20:
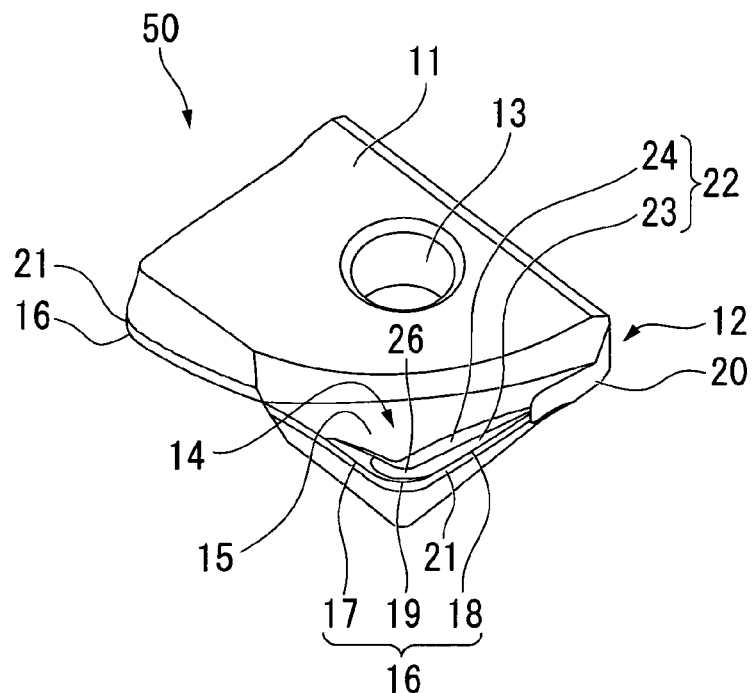
FIG. 20 is a perspective view showing a cutting insert of a fourth embodiment of the invention.
Figure 21:
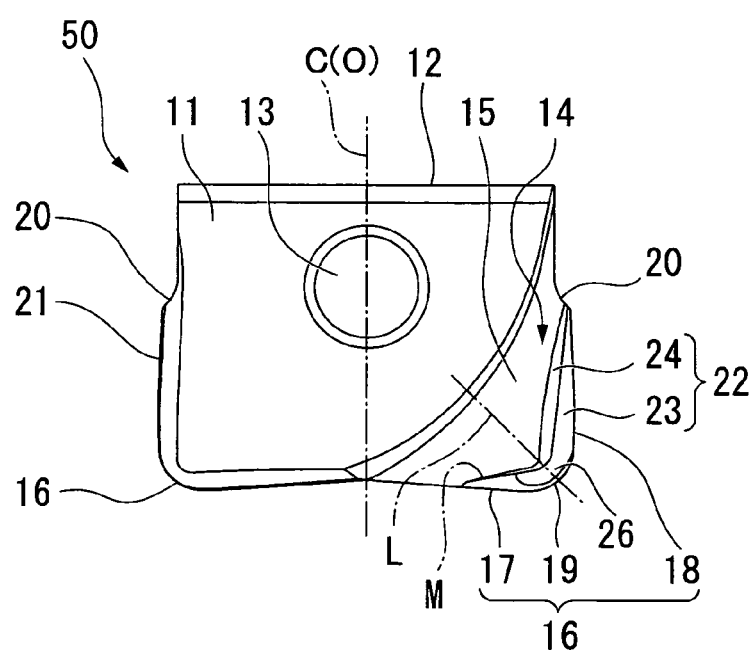
FIG. 21 is a plan view of the cutting insert of the embodiment shown in FIG. 20.
Figure 22:
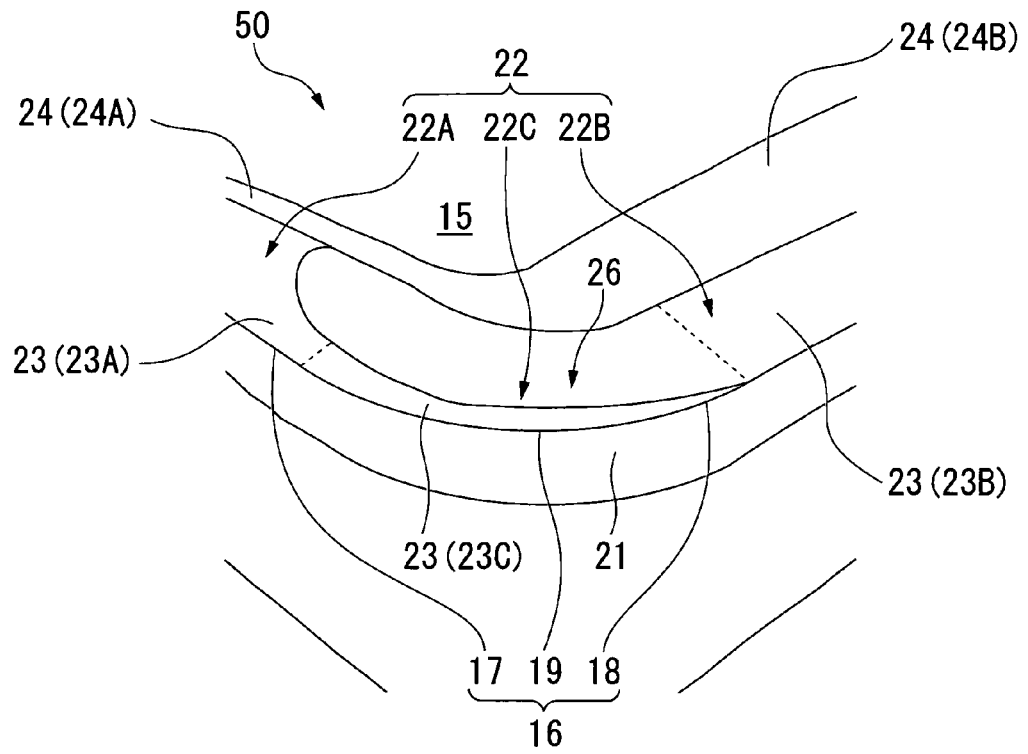
FIG. 22 is an enlarged perspective view of the periphery of a corner cutting edge of the cutting insert of the embodiment shown in FIG. 20.
Figure 23:
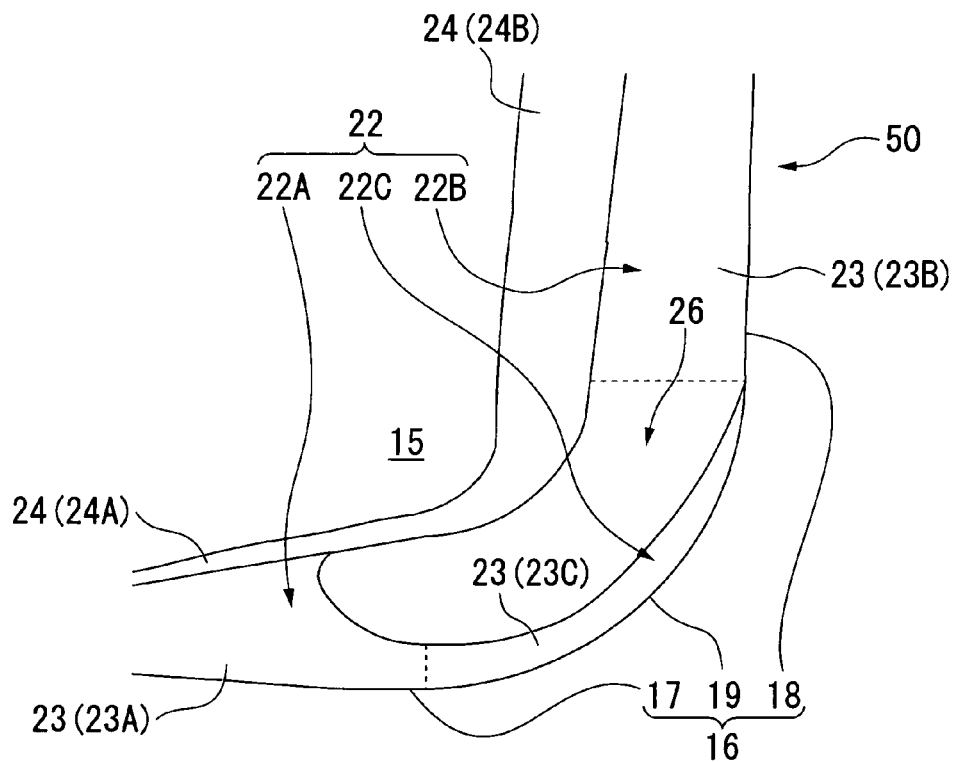
FIG. 23 is an enlarged plan view of the periphery of a corner cutting edge of the cutting insert of the embodiment shown in FIG. 20.

Here, in the third embodiment, the groove bottom face 23C of the corner cutting edge side chip breaker 22C which is formed in the shape of such a circular arc is smoothly connected to the groove bottom face 23A of the end cutting edge side chip breaker 22A and the groove bottom face 23B of the outer peripheral cutting edge side chip breaker 22B as indicated by a broken line in FIGS. 18 and 19 on the side of the cutting edge 16 (on the side of the end cutting edge 17 and the outer peripheral cutting edge 18). However, in a way similar to the second embodiment, as the groove bottom face 23A of the end cutting edge side chip breaker 22A protrudes with respect to the groove bottom face 23B of the outer peripheral cutting edge side chip breaker 22B, the groove bottom face 23C of the corner cutting edge side chip breaker 22C also rises gradually as it approaches the groove bottom face 23A of the end cutting edge side chip breaker 22A from the groove bottom face 23B of the outer peripheral cutting edge side chip breaker 22B. In addition, the groove bottom face 23C has a shape which is slightly lower in the thickness direction via a step 25 with respect to the groove bottom face 23B of the outer peripheral cutting edge side chip breaker 22B on the inner peripheral side of a circular arc formed by the groove bottom face 23C.

Accordingly, in a cutting insert 40 of the third embodiment, even if the radius of a convex circular arc formed by the corner cutting edge 19 is small, the groove bottom face 23C of the corner cutting edge side chip breaker 22C connected to the corner cutting edge 19 is circular-arc-shaped as described above. Therefore, the center of the corner cutting edge 19 is not located on the groove bottom face 23C, and only the strip-shaped groove bottom face 23C which is slightly lower than the groove bottom face 23B of the outer peripheral cutting edge side chip breaker 22B through the step 25 as described above may be formed in the shape of a twist face whose inclination toward the rear side in the end-mill rotational direction T gradually becomes larger as it approaches the center of the convex circular arc from the corner cutting edge 19. For this reason, the groove bottom face 23C of the rake face 15 on the side of the side ridge portion along the corner cutting edge 19 can be formed in the shape of such a twist face with a high level of precision, and a positive cutting edge inclination angle can also be given to the corner cutting edge 19. Thus, even in a case where the radius of the corner cutting edge 19 is small, a favorable chip discharge performance can be obtained.

In addition, in the second and third embodiments, the groove bottom face 23A of the end cutting edge side chip breaker 22A protrudes more than the groove bottom face 23B of the outer peripheral cutting edge side chip breaker 22B in this way. However, the groove bottom face 23C of the corner cutting edge side chip breaker 22C which connect them together is desirably formed so as to connect with the groove bottom faces 23A and 23B smoothly in contact therewith as a whole in the case of the second embodiment, and is desirably formed so as to connect with the groove bottom faces smoothly in contact therewith at least on the side of the cutting edge 16 in the case of the third embodiment. When the groove bottom faces 23A to 23C intersect each other via an angle portion on the side of the cutting edge 16, the cutting edge inclination angle or the rake angle changes sharply in a place which straddles this angle portion, and has an effect on chip discharge or cutting resistance, and an angle portion is formed even on the cutting edge 16, and chipping or the like occurs easily.

Additionally, when the radius of a convex circular arc formed by the corner cutting edge 19 is small as described above, that is, when the cutting edge inclination angle of the end cutting edge 17 is large, and thus, the radial rake angle on the side of the end cutting edge is large toward the negative angle, a possibility occurs that the flow of chips on the side of the outer peripheral cutting edge 18 of the corner cutting edge 19 which is adjacent thereto or at the outer peripheral cutting edge 18 is affected by this, and thus, favorable sharpness cannot be obtained, but an increase in cutting resistance may occur. Accordingly, in such a case, similarly to the first embodiment, it is desirable that the cutting edge inclination angle of the rake face (groove bottom face 23) is not constant at the portion formed in the shape of a twist face, but the cutting edge inclination angle of the corner cutting edge becomes large as it approaches the outer peripheral cutting edge from the end cutting edge.

Meanwhile, in a case where the radius of the corner cutting edge 19 is small as described above, or even in a case where the radius of the corner cutting edge 19 is large, similarly to a cutting insert 50 of a fourth embodiment shown in FIGS. 20 to 26, and a cutting insert 60 of a fifth embodiment shown in FIGS. 27 to 30, it is desirable to form a recess 26 recessed with respect to the rake face 15 along at least a portion of the corner cutting edge 19, at the groove bottom face 23 of the chip breaker 22, i.e., on the side of the side ridge portion of the rake face 15, so as to be spaced apart from the cutting edge 16. In addition, the fifth embodiment shows a case where the radius of the corner cutting edge 19 is as small as about 1 mm or less similarly to the second and third embodiments, and the fourth embodiment shows a case where the radius of the corner cutting edge 19 is equal to or more than 1 mm.

That is, when such a recess 26 is formed, chips which have been generated by the corner cutting edge 19 and have scratched on the rake face 15 (the groove bottom face 23 of the chip breaker 22 or the groove bottom face 23C of the corner cutting edge side chip breaker 22C) are separated from the rake face 15 and do not contact the rake face in a place where they have arrived at the recess 26, or since the pressure of contact becomes weak, cutting resistance can be reduced. Meanwhile, since the recess 26 is spaced apart via the portion of the rake face 15 on the side of the side ridge portion between the recess and the cutting edge 16 (corner cutting edge 19), the cutting edge strength of the cutting edge 16 does not deteriorate.

Figure 24:
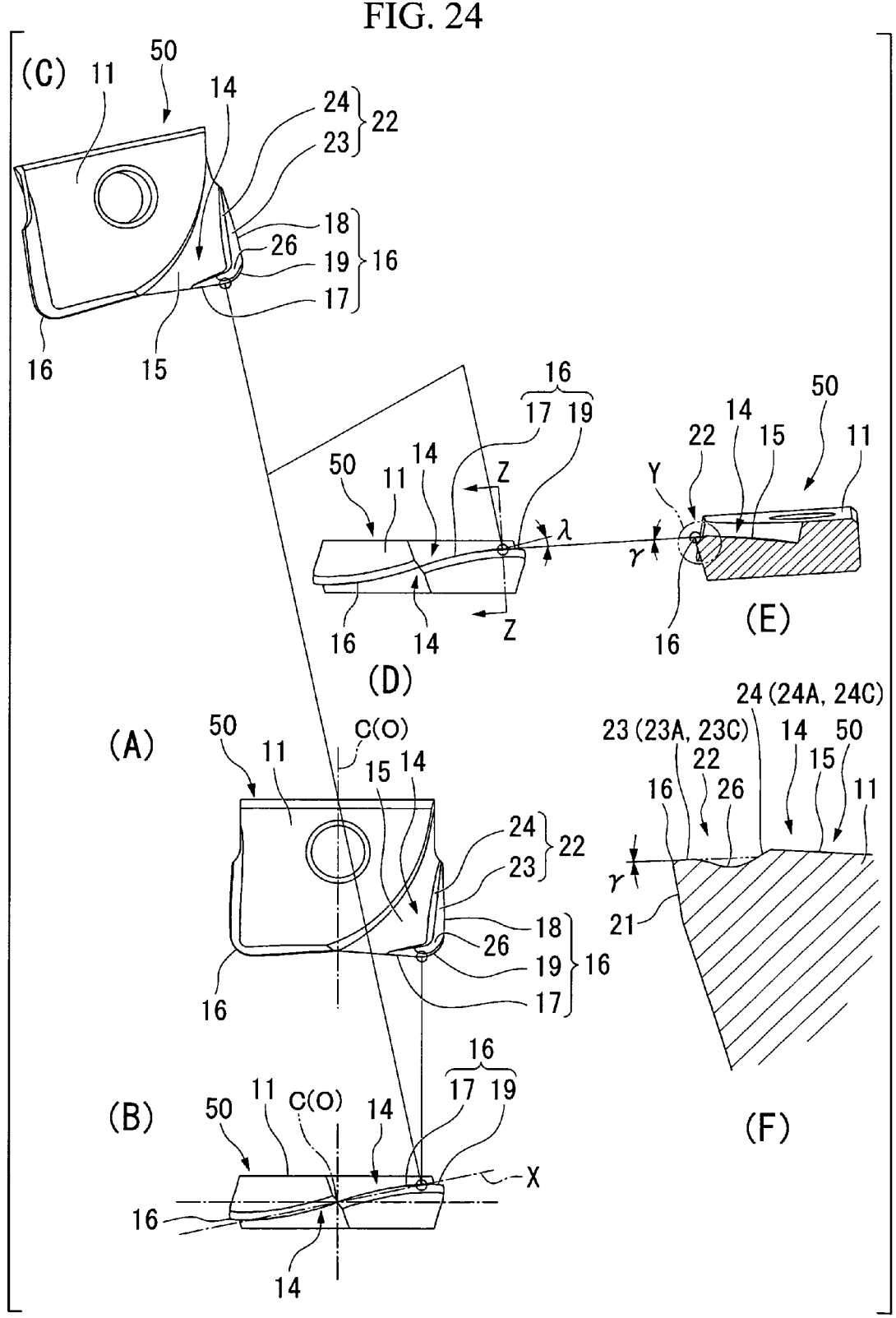
FIG. 24 is an explanatory view in a state where the cutting insert of the embodiment shown in FIG. 20 is attached to an end mill body, and specifically.
Figure 25:
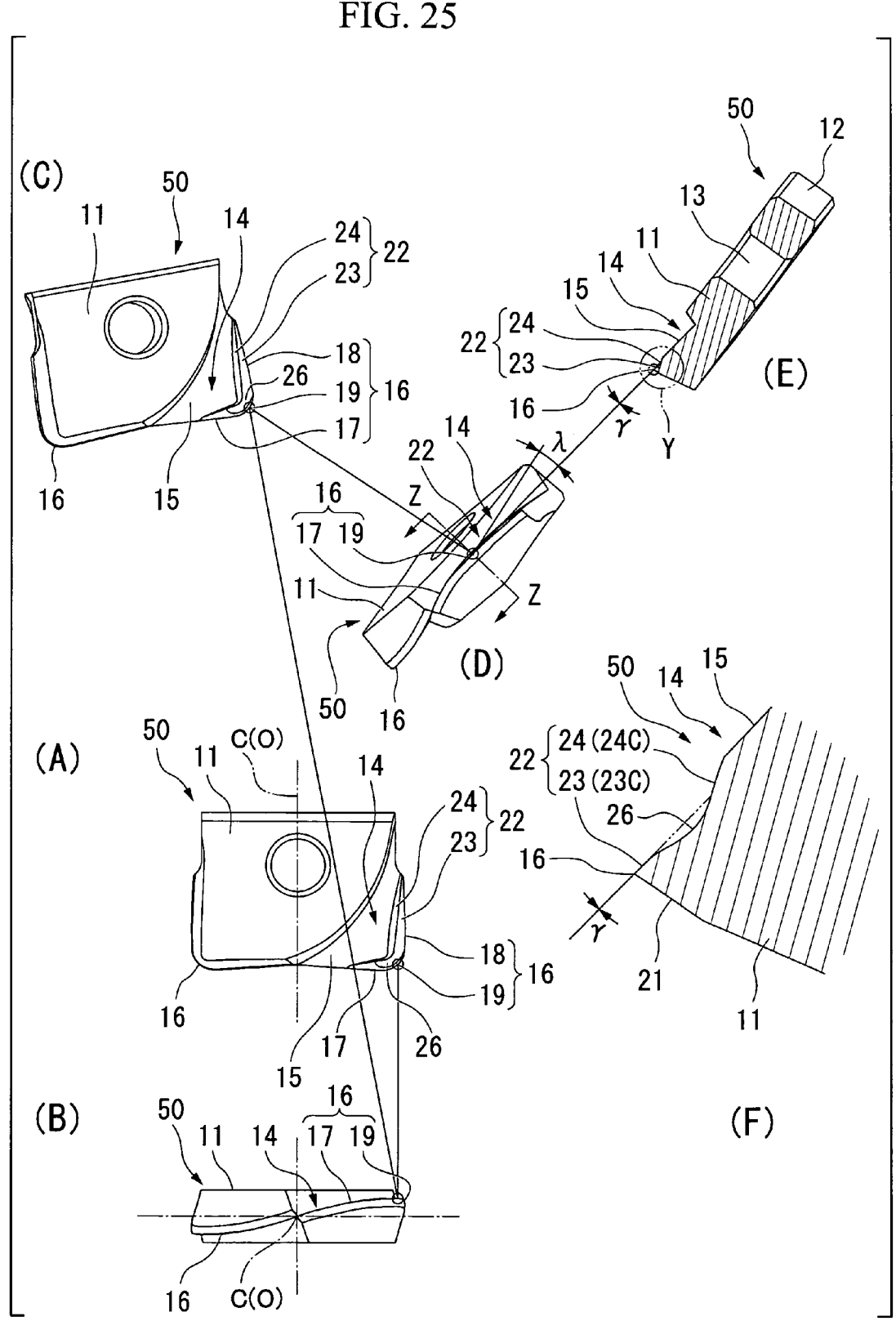
FIG. 25 is an explanatory view in a state where the cutting insert of the embodiment shown in FIG. 20 is attached to an end mill body, and specifically.
Figure 26:
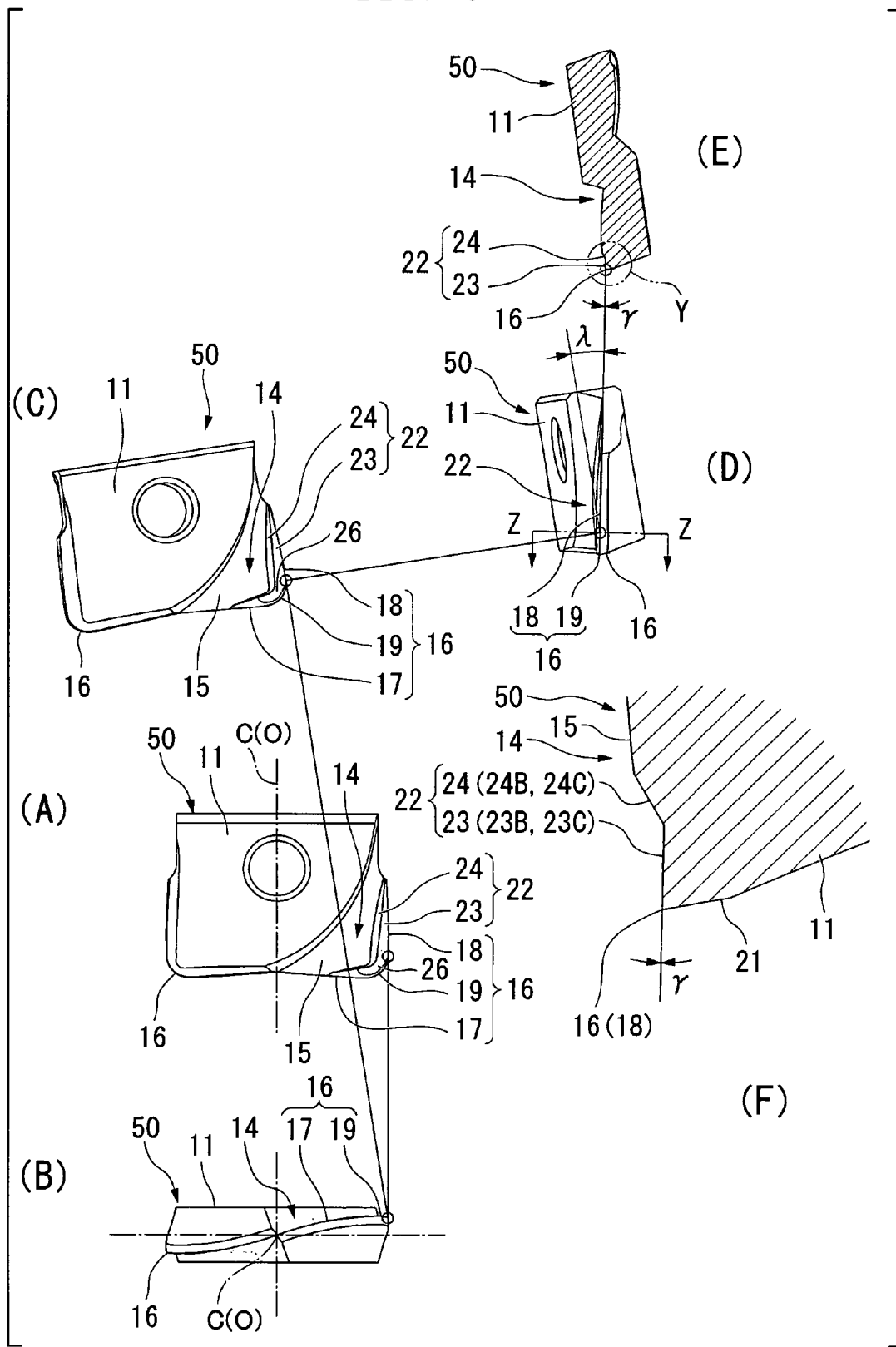
FIG. 26 is an explanatory view in a state where the cutting insert of the embodiment shown in FIG. 20 is attached to an end mill body, and specifically.
Figure 27:
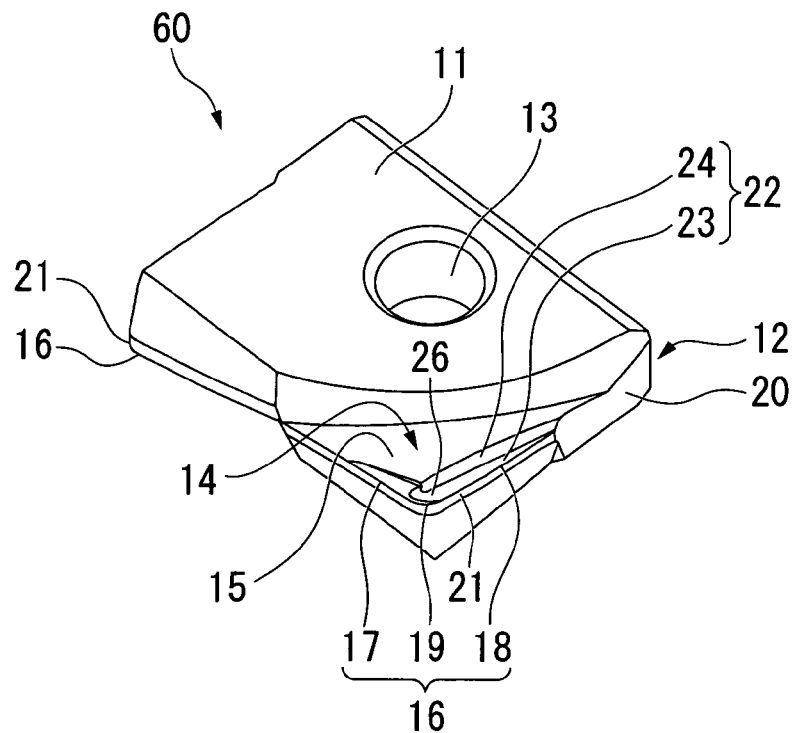
FIG. 27 is a perspective view showing a cutting insert of a fifth embodiment of the invention.
Figure 28:
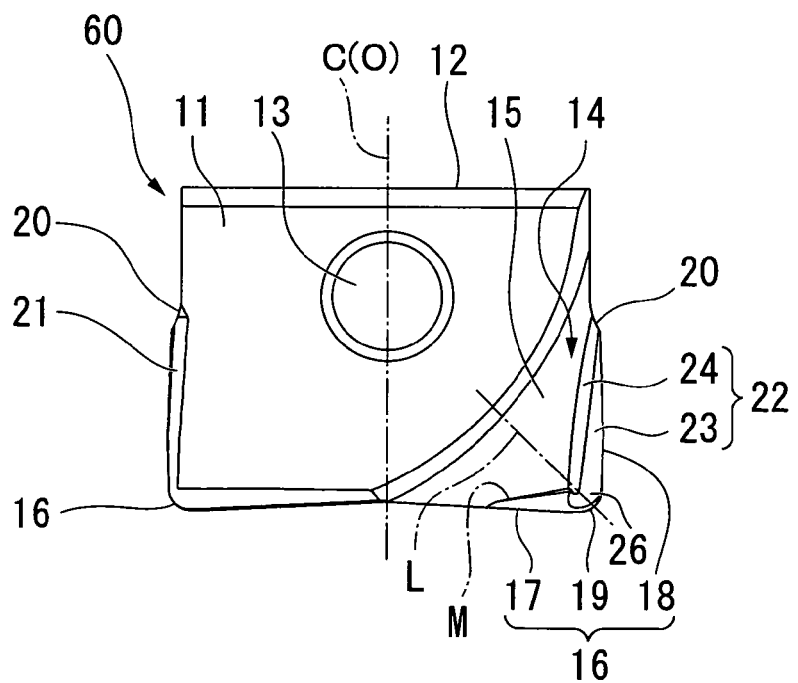
FIG. 28 is a plan view of the cutting insert of the embodiment shown in FIG. 27.
Figure 29:
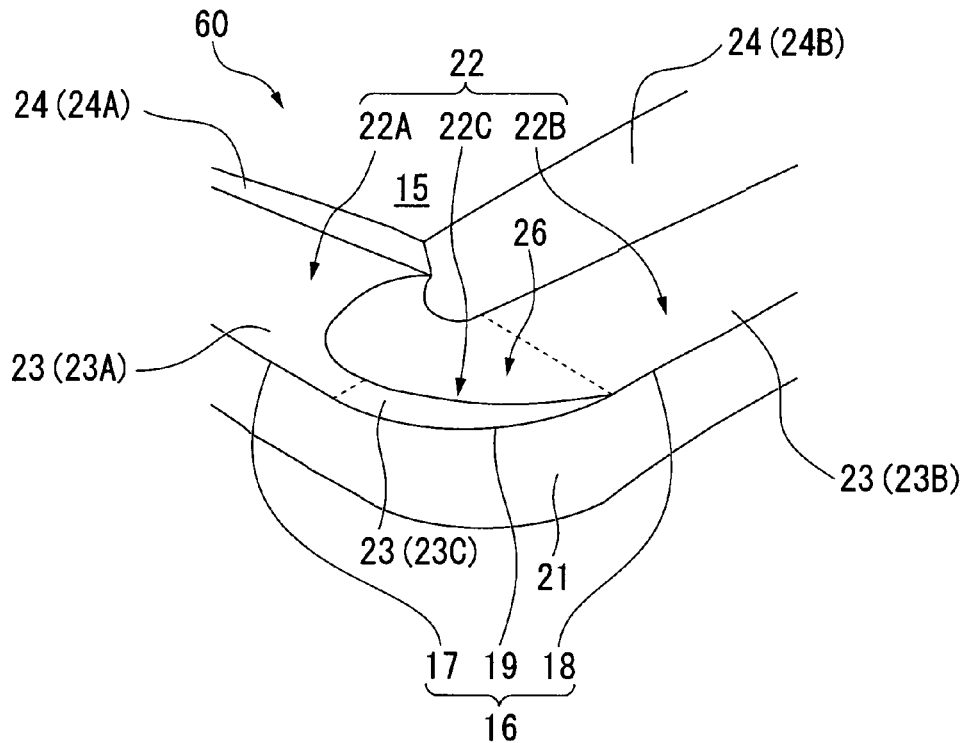
FIG. 29 is an enlarged perspective view of the periphery of a corner cutting edge of the cutting insert of the embodiment shown in FIG. 27.
Figure 30:
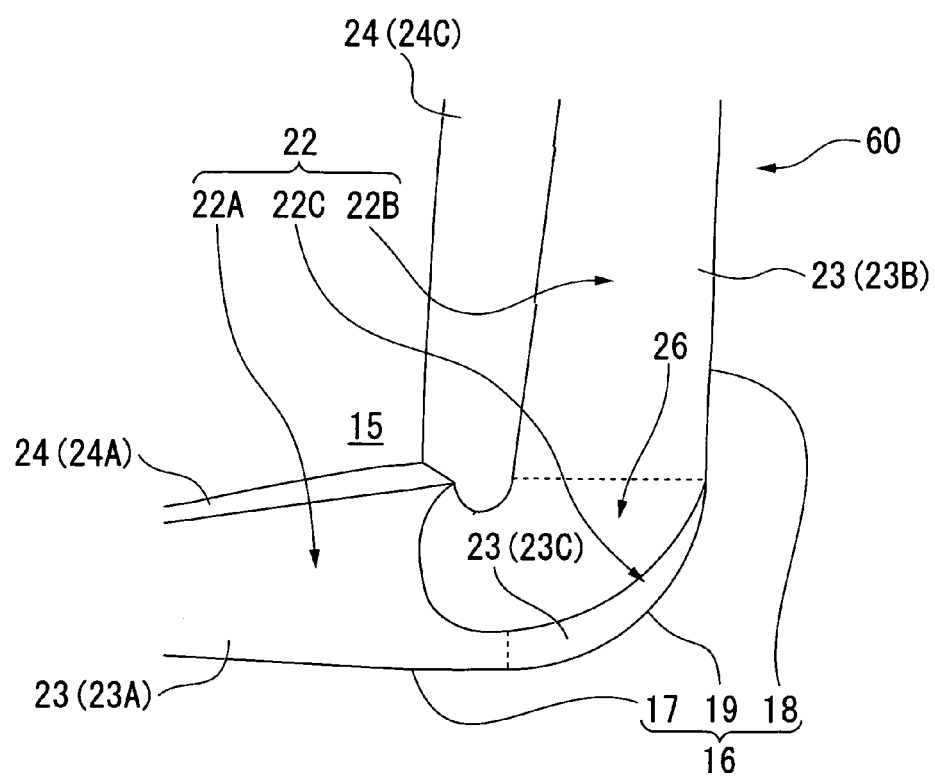
FIG. 30 is an enlarged plan view of the periphery of a corner cutting edge of the cutting insert of the embodiment shown in FIG. 27.

Here, in the fourth and fifth embodiments, the recess 26, as shown in FIGS. 24(F) and 25(F) of FIG. 24 to FIG. 25, is formed such that the bottom face thereof is formed in the shape of a concave curve, and the groove bottom face 23 of the chip breaker 22 is engraved. The recess 26 extends so as to go round toward the inner peripheral side of the tip of the end mill body 1 in the above attached state along the corner cutting edge 19 at a distance from the corner cutting edge 19 from a contact point of the corner cutting edge 19 with the outer peripheral cutting edge 18, and is formed so as to rise in the groove bottom face 23 in a place beyond the contact point between the corner cutting edge 19 and the end cutting edge 17. Therefore, the groove bottom face 23 (groove bottom face 23C of the corner cutting edge side chip breaker 22C of the second and third embodiments) of the chip breaker 22 connected to the corner cutting edge 19 is formed so as to become gradually wider from the contact point between the corner cutting edge 19 and the outer peripheral cutting edge 18 by this recess 26 toward the contact point between the corner cutting edge 19 and the end cutting edge 17.

In addition, in the fourth and fifth embodiments, the groove bottom face 23 (groove bottom face 23A of the end cutting edge side chip breaker 22A of the second and third embodiments) of the chip breaker 22 connected to the end cutting edge 17 may be planar, and the groove bottom face 23 (groove bottom face 23B of the outer peripheral cutting edge side chip breaker 22B of the second and third embodiments) of the chip breaker 22 connected to the outer peripheral cutting edge 18 may be formed in the shape of a twist face whose radial rake angle becomes constant with respect to the outer peripheral cutting edge 18 twisted toward the rear side in the end-mill rotational direction T as it approaches the rear end in the direction of the axis O of the end mill body 1 in the attached state. In this regard, the corner cutting edge 19 has a positive cutting edge inclination angle, and the groove bottom face 23 connected to the corner cutting edge 19 is inclined toward the rear side in the end-mill rotational direction T as it approaches the outer peripheral cutting edge 18 from the end cutting edge 17, and is formed in the shape of a twist face whose inclination toward the rear side in the end-mill rotational direction T becomes gradually large as it approaches the center of the convex circular arc from the corner cutting edge 19.

Accordingly, even in the fourth and fifth embodiments, the same effects as those of the first embodiment or the second and third embodiments can be obtained. In addition, the recess 26 is formed in the groove bottom face 23 (rake face 15) of the chip breaker 22 at a distance from the cutting edge 16. Thus, cutting resistance can be reduced without deteriorating the cutting edge strength of the cutting edge 16, and it becomes possible to further promote smoother cutting.

In addition, in the first to fifth embodiments, the twist face of the rake face 15 on the side of the side ridge portion along at least the corner cutting edge 19 of the rake face 15 is formed by the groove bottom face 23 of the chip breaker 22 in this way. However, the portion of the rake face 15 on the side of the side ridge portion may be formed in the shape of a twist face without forming such a chip breaker 22. Additionally, the whole rake face 15 may be formed in the shape of the same twist face depending on the case.

Additionally, in the above description, the case where the invention is applied to the indexable radius end mill on which the cutting inserts 10, 30, 40, 50, and 60 of the first to fifth embodiments are mounted on the end mill body 1 according to the embodiments shown in FIGS. 1 to 3 has been described. However, it is natural that the invention can be applied to a so-called solid radius end mill in which a chip discharge flute or the gash 14 is formed at the tip portion of the end mill body 1 itself, the wall face which faces the end-mill rotational direction T is used as the rake face 15, and the twist face as described above is directly formed on the side of the side ridge portion of the rake face 15 along at least a portion of the corner cutting edge 19. Moreover, the invention can also be applied to a so-called brazed radius end mill in which the cutting inserts 10, 30, 40, 50, and 60 as described above are anchored to and integrated with the end mill body 1 by brazing or the like. Additionally, a chip discharge flute may be formed by notching the end mill body 1 so as to extend diagonally from the center of the tip portion of the end mill body 1 to the outer peripheral side of the end mill body 1 along the gash 14 as shown _FIG. 1 to 3. Moreover, a chip discharge flute may be formed on the outer peripheral of the end mill body 1 so as to extend in the direction of the axis of the end mill body 1, and in this case, the chip discharge flute may be spirally twisted same as the Patent Document 1.

While preferred embodiments of the invention have been described and illustrated above, it should be understood that these are exemplary of the invention and are not to be considered as limiting. Additions, omissions, substitutions, and other modifications on the configuration can be made without departing from the spirit or scope of the present invention. Accordingly, the invention is not to be considered as being limited by the foregoing description, and is only limited by the scope of the appended claims.

INDUSTRIAL APPLICABILITY

As for the invention, it is possible to provide an end mill capable of securing favorable chip discharge performance to promote stable cutting to improve machining accuracy, and extending the life of tools. Accordingly, the invention has industrial applicability.

The invention claimed is:

1. A radius end mill comprising:
   an end mill body which is rotated around an axis thereof;
   a chip discharge flute being provided at an outer periphery of a tip portion of the end mill body;
   a gash being provided at a tip portion of the chip discharge flute;
   a rake face being formed on a wall face facing an end-mill rotational direction in the chip discharge flute or the gash;
   a cutting edge being formed on the rake face;
   the cutting edge including an end cutting edge, an outer peripheral cutting edge, and a convex circular-arc-shaped corner cutting edge;
   the end cutting edge being formed at a side ridge portion on the tip portion of the rake face;
   the outer peripheral cutting edge being formed at a side ridge portion on the outer peripheral side of the rake face;
   the convex circular-arc-shaped corner cutting edge being formed at a corner side ridge portion formed by the end cutting edge and the outer peripheral cutting edge;
   wherein the corner cutting edge has a positive cutting edge inclination angle; and
   the portion of the rake face on the side of the side ridge portion along at least a portion of the corner cutting edge is inclined toward the rear side in the end-mill rotational direction as it approaches the outer peripheral cutting edge from the end cutting edge, and is formed in the shape of a twist face whose inclination toward the rear side in the end-mill rotational direction gradually becomes larger as it approaches the center of curvature of the convex circular arc formed by the corner cutting edge from the corner cutting edge.

2. The radius end mill according to claim 1, wherein the cutting edge is set to have a constant normal (right) rake angle in the portion in which the rake face is formed in the shape of a twist face.

3. The radius end mill according to claim 1, wherein the corner cutting edge is formed in a spiral shape which is twisted toward the rear side in the end-mill rotational direction along a partial doughnut-shaped convex curve which is formed by a rotational locus when a convex circular arc formed by the corner cutting edge as seen from a direction facing the rake face is rotated around the axis as it approaches the outer peripheral cutting edge from the end cutting edge.

4. The radius end mill according to claim 3,
   wherein the cutting edge is set to have a constant cutting edge inclination angle in the portion in which the rake face is formed in the shape of a twist face.

5. The radius end mill according to claim 1, wherein the portion of the rake face on the side of the side ridge portion along the cutting edge is formed with an end cutting edge side chip breaker having a groove bottom face connected to the end cutting edge, an outer peripheral cutting edge side chip breaker having a groove bottom face connected to the outer peripheral cutting edge, and a corner cutting edge side chip breaker having a groove bottom face connected to the corner cutting edge, and wherein the groove bottom face of the end cutting edge side chip breaker is made to protrude more than the groove bottom face of the outer peripheral cutting edge side chip breaker, and the groove bottom face of the corner cutting edge side chip breaker is formed in the shape of a fan or a circular arc along the corner cutting edge so as to form a shallow ridge as it approaches the groove bottom face of the end cutting edge side chip breaker from the groove bottom face of the outer peripheral cutting edge side chip breaker, and the portion of the side ridge portion along at least a portion of the corner cutting edge in the groove bottom face of the corner cutting edge side chip breaker is formed in the shape of a twist face.

6. The radius end mill according to claim 5, wherein the groove bottom face of the corner cutting edge side chip breaker connects smoothly with the groove bottom face of the end cutting edge side chip breaker and the groove bottom face of the outer peripheral cutting edge side chip breaker, at least on the side of the cutting edge.

7. The radius end mill according to claim 5, wherein the cutting edge inclination angle of the corner cutting edge becomes large as it approaches the outer peripheral cutting edge from the end cutting edge.

8. The radius end mill according to claim 1, wherein the portion of the rake face on the side of the side ridge portion along at least a portion of the corner cutting edge is formed with a recess which is recessed with respect to the rake face at a distance from the cutting edge.

9. The radius end mill according to claim 5, wherein the portion of the rake face on the side of the side ridge portion along at least a portion of the corner cutting edge is formed with a recess which is recessed with respect to the rake face at a distance from the cutting edge.

10. The radius end mill according to claim 1, wherein the tip portion of the end mill body is formed with an insert mounting seat, a cutting insert having the flat plate-shaped insert body to be detachably attached to the insert mounting seat, and the insert body is formed with the rake face and the cutting edge.

11. A cutting insert to be detachably attached to an insert mounting seat formed at a tip portion of the end mill body in the radius end mill according to claim 10, comprising:
a flat plate-shaped insert body,
wherein the insert body is formed with the rake face and the cutting edge.

12. The radius end mill according to claim 2, wherein the tip portion of the end mill body is formed with an insert mounting seat, a cutting insert having the flat plate-shaped insert body to be detachably attached to the insert mounting seat, and the insert body is formed with the rake face and the cutting edge.

13. The radius end mill according to claim 3, wherein the tip portion of the end mill body is formed with an insert mounting seat, a cutting insert having the flat plate-shaped insert body to be detachably attached to the insert mounting seat, and the insert body is formed with the rake face and the cutting edge.

14. The radius end mill according to claim 4, wherein the tip portion of the end mill body is formed with an insert mounting seat, a cutting insert having the flat plate-shaped insert body to be detachably attached to the insert mounting seat, and the insert body is formed with the rake face and the cutting edge.

15. The radius end mill according to claim 5, wherein the tip portion of the end mill body is formed with an insert mounting seat, a cutting insert having the flat plate-shaped insert body to be detachably attached to the insert mounting seat, and the insert body is formed with the rake face and the cutting edge.

16. The radius end mill according to claim 6, wherein the tip portion of the end mill body is formed with an insert mounting seat, a cutting insert having the flat plate-shaped insert body to be detachably attached to the insert mounting seat, and the insert body is formed with the rake face and the cutting edge.

17. A cutting insert to be detachably attached to an insert mounting seat formed at a tip portion of the end mill body in the radius end mill according to claim 12, comprising:
a flat plate-shaped insert body,
wherein the insert body is formed with the rake face and the cutting edge.

18. A cutting insert to be detachably attached to an insert mounting seat formed at a tip portion of the end mill body in the radius end mill according to claim 13, comprising:
a flat plate-shaped insert body,
wherein the insert body is formed with the rake face and the cutting edge.

19. A cutting insert to be detachably attached to an insert mounting seat formed at a tip portion of the end mill body in the radius end mill according to claim 14, comprising:
a flat plate-shaped insert body,
wherein the insert body is formed with the rake face and the cutting edge.

20. A cutting insert to be detachably attached to an insert mounting seat formed at a tip portion of the end mill body in the radius end mill according to claim 15, comprising:
a flat plate-shaped insert body,
wherein the insert body is formed with the rake face and the cutting edge.

* * * * *